(12) United States Patent
Lim et al.

(10) Patent No.: US 12,112,345 B2
(45) Date of Patent: Oct. 8, 2024

(54) SYSTEMS AND METHODS FACILITATING SURVEY COMPLETION AND REVIEW

(71) Applicant: People Center, Inc., San Francisco, CA (US)

(72) Inventors: Cassandra Jia Hui Lim, San Jose, CA (US); Katherine Ifeoma Okpara, San Francisco, CA (US); Paras Rajesh Bheda, Santa Clara, CA (US); Vahid Fazel-Rezai, San Mateo, CA (US)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 17/744,242

(22) Filed: May 13, 2022

(65) Prior Publication Data

US 2023/0368225 A1   Nov. 16, 2023

(51) Int. Cl.
*G06Q 30/0203* (2023.01)
(52) U.S. Cl.
CPC .................. *G06Q 30/0203* (2013.01)
(58) Field of Classification Search
CPC .................................. G06Q 30/0203
See application file for complete search history.

(56) References Cited

U.S. PATENT DOCUMENTS

| 2007/0282841 | A1* | 12/2007 | Sreedhar | G06F 21/53 |
| | | | | 707/999.009 |
| 2011/0231226 | A1* | 9/2011 | Golden | G06Q 40/12 |
| | | | | 705/30 |
| 2012/0102114 | A1* | 4/2012 | Dunn | G06F 3/04842 |
| | | | | 709/204 |

FOREIGN PATENT DOCUMENTS

WO   WO-2016053718 A1 * 4/2016 ....... G06F 17/30082

OTHER PUBLICATIONS

Klaus Blass, Why You Should Store Your Survey Data in a Graph Database, Nov. 29, 2020 (Year: 2020).*
Barkley et al., Managing Role/Permission Relationships Using Object Access Types, National Institute of Standards and Technology, Jul. 20, 1998. (Year: 1998).*

* cited by examiner

*Primary Examiner* — Nadja N Chong Cruz
(74) *Attorney, Agent, or Firm* — Dority & Manning, P.A.

(57) ABSTRACT

Methods, systems, devices, and tangible non-transitory computer readable media facilitating dynamic restriction of a viewer's access to survey responses provided by respondents of a survey based on the viewer's relationship with each respondent. In an example embodiment, the disclosed technology can: generate a survey data object that specifies a set of participants and a set of delegates associated with a survey; define, for a delegate in the set of delegates, a data access rule that specifies a subset of participants in the set of participants that are constituents of the delegate; receive, from the delegate, a request to access survey response data; evaluate the data access rule to identify the constituents of the delegate; filter the survey response data to extract constituent response data corresponding to the constituents of the delegate; and/or return the constituent response data to the delegate.

20 Claims, 6 Drawing Sheets

SYSTEMS AND METHODS FACILITATING SURVEY COMPLETION AND REVIEW

FIELD

The present disclosure relates generally to systems and methods that facilitate the management of surveys. More particularly, the present disclosure relates to systems and methods that facilitate survey completion and review.

BACKGROUND

Existing survey management systems allow an administrator to configure and/or manage various aspects related to a survey (e.g., a questionnaire), including, for instance, defining who can provide responses to the survey, defining who can view the survey responses, defining the survey lifecycle, and/or another aspect related to the survey. For example, the administrator can use an existing survey management system to define the participant authentication and authorization features of a survey to grant certain users with access to the survey (e.g., to survey questions) such that they can provide responses to the survey. As another example, the administrator can use an existing survey management system to define the viewer authentication and authorization features of a survey to grant certain users with access rights (e.g., access permission) to view the survey responses, while restricting other users from doing so.

A problem with using such existing survey management systems to define the participant and/or viewer authentication and authorization features is that the administrator is tasked with manually exporting data from one system (e.g., an organizational and/or database management platform) to another system (e.g., the survey management system) such that the administrator can grant specific users with access rights to provide responses to the survey and grant certain users with access rights to view the survey responses. Another problem with using such existing survey management systems to define the participant and/or viewer authentication and authorization features is that the access rights granted by the administrator are specific to a certain user(s), to a certain respondent(s), and/or to a certain response(s), and thus, the process is neither dynamic nor scalable.

SUMMARY

Aspects and advantages of embodiments of the present disclosure will be set forth in part in the following description, or can be learned from the description, or can be learned through practice of the embodiments.

According to an example embodiment of the present disclosure, a computing system that can implement an organizational management platform that can control and leverage one or more sets of organizational data to manage organizational applications for one or more organizations that respectively correspond to the one or more sets of organizational data can include one or more processors. The computing system can further include one or more non-transitory computer-readable media that can store instructions that, when executed by the one or more processors, can cause the computing system to perform one or more operations. The one or more operations can include generating a survey data object that specifies a set of participants and a set of delegates associated with a survey. The one or more operations can further include defining, for a delegate in the set of delegates, a data access rule that specifies a subset of participants in the set of participants that are constituents of the delegate. The one or more operations can further include receiving, from the delegate, a request to access survey response data. The one or more operations can further include evaluating the data access rule to identify the constituents of the delegate. The one or more operations can further include filtering the survey response data to extract constituent response data corresponding to the constituents of the delegate. The one or more operations can further include returning the constituent response data to the delegate.

According to another example embodiment of the present disclosure, a computer-implemented method to grant partial access to survey responses can include generating, by a computing system operatively coupled to one or more processors, a survey data object that specifies a set of participants and a set of delegates associated with a survey. The computer-implemented method can further include defining, by the computing system, for a delegate in the set of delegates, a data access rule that specifies a subset of participants in the set of participants that are constituents of the delegate. The computer-implemented method can further include receiving, by the computing system, from the delegate, a request to access survey response data. The computer-implemented method can further include evaluating, by the computing system, the data access rule to identify the constituents of the delegate. The computer-implemented method can further include filtering, by the computing system, the survey response data to extract constituent response data corresponding to the constituents of the delegate. The computer-implemented method can further include returning, by the computing system, the constituent response data to the delegate.

According to another example embodiment of the present disclosure, one or more tangible non-transitory computer-readable media can store computer-readable instructions that, when executed by one or more processors, can cause the one or more processors to perform operations. The operations can include generating a survey data object that specifies a set of participants and a set of delegates associated with a survey. The operations can further include defining, for a delegate in the set of delegates, a data access rule that specifies a subset of participants in the set of participants that are constituents of the delegate. The operations can further include receiving, from the delegate, a request to access survey response data. The operations can further include evaluating the data access rule to identify the constituents of the delegate. The operations can further include filtering the survey response data to extract constituent response data corresponding to the constituents of the delegate. The operations can further include returning the constituent response data to the delegate.

Other embodiments of the present disclosure are directed to various systems, apparatuses, non-transitory computer-readable media, computer-implemented methods, entity interfaces, and/or devices that can facilitate dynamic restriction of a viewer's access to survey responses provided by respondents of a survey based on the viewer's relationship with each respondent.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
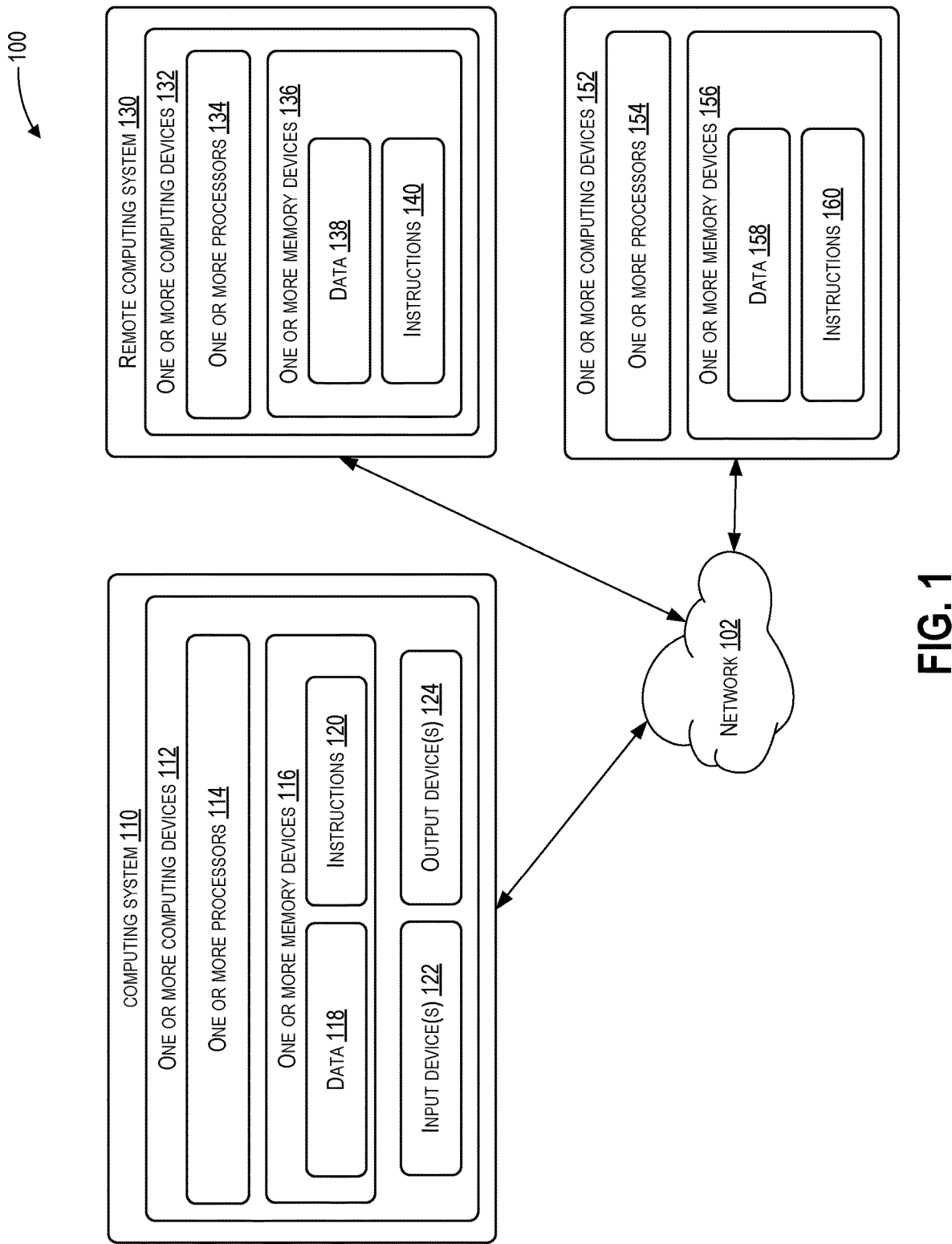
FIG. 1 depicts a block diagram of an example, non-limiting computing environment that can facilitate survey completion and review in accordance with one or more example embodiments of the present disclosure.

Repeated use of reference characters and/or numerals in the present specification and/or figures is intended to represent the same or analogous features, elements, or operations of the present disclosure. Repeated description of reference characters and/or numerals that are repeated in the present specification is omitted for brevity.

DETAILED DESCRIPTION

Reference now will be made in detail to embodiments, one or more examples of which are illustrated in the figures. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that embodiments of the present disclosure cover such modifications and variations.

As referenced herein, the term "entity" refers to a human, a user, an end-user, a consumer, a computing device and/or program (e.g., a processor, computing hardware and/or software, an application), an agent, a machine learning (ML) and/or artificial intelligence (AI) algorithm, model, system, and/or application, and/or another type of entity that can implement and/or facilitate implementation of one or more embodiments of the present disclosure as described herein, illustrated in the accompanying drawings, and/or included in the appended claims. As referred to herein, the terms "includes" and "including" are intended to be inclusive in a manner similar to the term "comprising." As referenced herein, the terms "or" and "and/or" are generally intended to be inclusive, that is (i.e.), "A or B" or "A and/or B" are each intended to mean "A or B or both." As referred to herein, the terms "first," "second," "third," and so on, can be used interchangeably to distinguish one component or entity from another and are not intended to signify location, functionality, or importance of the individual components or entities. As referenced herein, the terms "couple," "couples," "coupled," and/or "coupling" refer to chemical coupling (e.g., chemical bonding), communicative coupling, electrical and/or electromagnetic coupling (e.g., capacitive coupling, inductive coupling, direct and/or connected coupling), mechanical coupling, operative coupling, optical coupling, and/or physical coupling.

Example embodiments of the present disclosure are directed to systems and methods for facilitating survey completion and review. In some embodiments, such systems and/or methods can leverage an object graph (e.g., an object graph data structure), one or more objects therein, and/or a rule to facilitate survey completion and review. In one example embodiment, such systems and/or methods can be implemented to define participants of a survey using one or more objects of an object graph (e.g., a survey data object) and/or a rule (e.g., a data access rule). In another example embodiment, such systems and/or methods can be implemented to grant viewer access rights (e.g., access permissions) to view survey responses using one or more objects of an object graph (e.g., a survey delegation object) and/or a rule (e.g., data access rule).

In at least one embodiment described herein, such systems and/or methods can be implemented to facilitate the dynamic restriction of a viewer's access to survey responses provided by respondents of a survey based on one or more common attributes that can be shared by and/or otherwise associated with the viewer and/or the respondent(s). In some embodiments, such common attribute(s) can include, for instance, a common city and/or state of residence (e.g., San Francisco, California), a common department of an organization in which the viewer and/or the respondent(s) work (e.g., engineering department), a common salary (e.g., a minimum or maximum salary earned by the viewer and/or the respondents), a common employment role or position (e.g., a "team member" role of the respondents and/or a "team manager" role of the viewer), and/or another common attribute.

In at least one embodiment, the systems and/or methods described herein according to example embodiments can be implemented to facilitate the dynamic restriction of a viewer's access to survey responses provided by respondents of a survey based on the viewer's relationship with each respondent. More specifically, example embodiments of the present disclosure are directed to an organizational management platform that can constitute and/or include a computing system that can facilitate dynamic restriction of a viewer's access to survey responses provided by respondents of a survey based on the viewer's relationship with each respondent in accordance with at least one embodiment described herein. In particular, example embodiments of the present disclosure are directed to an organizational management platform that can constitute and/or include a computing system that can facilitate dynamic restriction of a delegate's (e.g., a manger's) access to survey responses provided by constituents of the delegate (e.g., employees managed by the manager) based on the delegate's relationship with each constituent in accordance with at least one embodiment described herein.

As referenced herein, a "survey" can include and/or constitute, for instance, a questionnaire and/or a form having one or more questions that can be answered by one or more survey participants (also referred to herein as "respondents"). As used herein, the terms "participant" and "respondent" can each refer to a user (e.g., an employee of an organization) that has been granted access rights (e.g., permission rights) to the survey and can provide a response to the survey. As referred to herein, a "response" or "survey response" can include one or more answers provided by a participant, where each answer corresponds to a specific question in the survey. As referenced herein, an "editor" of a survey can describe a user (e.g., an administrator associated with an organizational management platform of an organization) that has full access to all aspects of the survey, including access to survey configuration settings and all survey responses received from all respondents. As employed herein, the term "delegate" can describe a user (e.g., a manager in an organization) that has been granted partial access rights (e.g., partial permission rights) to survey responses. For example, a delegate as defined herein can be granted (e.g., by the editor) access rights to view survey responses provided by certain participants depending on the relationship between the delegate and each of such certain participants. The participants for which the delegate has access to view survey responses are referred to herein as "constituents" of the delegate.

In one or more embodiments, the above-described organizational management platform and/or computing system can be associated with (e.g., owned by, operated by), for example, an organization (e.g., a company). In these one or more embodiments, the delegate and/or one or more of the constituents can be an employee of the organization. In at least one embodiment, the delegate can be, for instance, a manager in the organization and the constituents can each be an employee that is managed and/or supervised by the delegate.

According to one or more embodiments of the present disclosure, the above-described computing system can include and/or be coupled (e.g., communicatively, operatively) to one or more processors and/or one or more non-transitory computer-readable media. In one or more embodiments described herein, the one or more non-transitory computer-readable media can store instructions that, when executed by the one or more processors, can cause the computing system to perform one or more operations. In accordance with one or more embodiments of the present disclosure, execution of such instructions can cause the computing system to perform one or more operations. In these one or more embodiments, the computing system can perform such one or more operations to facilitate survey completion and review. For example, in at least one embodiment, the computing system can perform such one or more operations to facilitate dynamic restriction of a delegate's access to survey responses provided by constituents of the delegate based on the delegate's relationship with each constituent. In one or more example embodiments, computing system 110, remote computing system 130, one or more computing devices 152, and/or computing device 200 described below with reference to the example embodiments depicted in FIGS. 1 and 2 can perform such one or more operations described below to facilitate survey completion and review, including dynamic restriction of a delegate's access to survey responses provided by constituents of the delegate based on the delegate's relationship with each constituent.

To facilitate survey completion and review in accordance with example embodiments of the present disclosure, the above-described computing system (e.g., computing system 110) can generate (e.g., construct, configure) and/or maintain (e.g., access, modify) a single, centralized database (e.g., a multi-tenant database) that can include one or more sets of organizational data that can respectively correspond to one or more organizations (e.g., one or more companies). In example embodiments described herein, each set of the one or more sets of organizational data can constitute a centralized set of organizational data that acts as a single, centralized system of record for all organizational management processes of the organization to which the organizational data corresponds. In one or more embodiments described herein, the computing system can individually (e.g., discretely, separately) control and/or leverage each of the one or more sets of organizational data to respectively manage organizational applications for each of the one or more organizations. For example, in at least one embodiment, the computing system can, for each organization, manage organizational applications such as payroll, operations, human resources (e.g., onboarding and offboarding), benefits, information technology (IT) and device management, third-party application integration and access, and/or another organization application.

In example embodiments of the present disclosure, as described in detail below, each set of the one or more sets of organizational data can include data that can be represented, stored, and/or structured as a graph such as, for example, an object graph. In these one or more embodiments, each object graph can include a plurality of objects that can respectively correspond to different entities of the organization to which the organizational data in the object graph corresponds. In some embodiments, one or more of the plurality of objects can include data in the form of, for instance, one or more attribute values that respectively correspond to one or more attributes of the entity to which the object corresponds. In some embodiments, one or more of the plurality of objects can include instructions (e.g., software components, processing threads) that, when executed by the computing system (e.g., computing system 110), can cause the computing system to perform one or more operations in accordance with example embodiments of the present disclosure.

In at least one embodiment, the computing system (e.g., computing system 110) can access one or more of the above-described object graphs and/or one or more objects therein to perform one or more operations described herein in accordance with one or more example embodiments of the present disclosure. For example, in some embodiments, the computing system can traverse one or more of the above-described object graphs and/or one or more objects therein to access (e.g., read, analyze, retrieve, modify) the data (e.g., attribute value(s)) of such object(s) and/or implement (e.g., execute) instructions that can be in such object(s). In these or other embodiments, the computing system can use the data (e.g., attribute value(s)) of such object(s) to perform one or more operations described herein and/or implement (e.g., execute) the instructions that can be in such object(s) to perform such operation(s) in accordance with one or more embodiments of the present disclosure.

In one or more embodiments, the computing system (e.g., computing system 110) can traverse the above-described object graph(s) and/or object(s) therein by using a defined query language to run one or more queries against such object graph(s) and/or object(s) therein. In some embodiments, such a defined query language can constitute and/or include a special-purpose and/or customized query language that can be specific to an organization. In some embodiments, the defined query language can constitute and/or include a domain-specific query language. In some embodiments, the defined query language can constitute and/or include a declarative language. In some embodiments, the computing system (e.g., computing system 110) can employ the defined query language to define functions and/or queries that can return data that satisfies and/or responds to the functions and/or queries, respectively. In some embodiments, the defined query language can include functions and/or operators (e.g., organization functions and/or operators specific to an organization) that can leverage relationships within certain data (e.g., organizational relationships and/or relationships between entities within an organization and/or within organizational data). In one example embodiment, an organization function defined as "ORG(entity, relationship)" can return one or more entities that have a specified relationship with a specified entity. In another example embodiment, an organization function defined as "ORG(employee,relationship)" can return one or more employees that have a specified relationship with a specified employee. Additional details describing the defined query language are provided below in example embodiments of the present disclosure.

To facilitate survey completion and review, including dynamic restriction of a delegate's access to survey responses provided by constituents of the delegate based on the delegate's relationship with each constituent in accordance with example embodiments of the present disclosure, the above-described computing system (e.g., computing system 110) can generate a survey data object that specifies a set of participants and a set of delegates associated with a survey. For example, in one embodiment, the computing system can generate a survey data object that specifies a first set of employees working in a certain first role (e.g., a "team manager" role) within an organization as the set of delegates and specifies a second set of employees working in a certain second role (e.g., a "team member" role) within the organization as the set of participants. For instance, in this or another embodiment, the computing system can generate a survey data object that specifies the set of delegates as a first set of employees that each work as a "team manager" within the organization and specifies the set of participants as a second set of employees that each work as a "team member" within the organization. In this or another embodiment, each team member can be managed by at least one team manager and each team manager can manage at least one team member. In the above example embodiment, it should be appreciated that by specifying the set of delegates and the set of participants based on the first role and the second role, respectively, the computing system can thereby generate the survey data object such that it can be applied universally with respect to the first role and the second role in the organization, rather than applied specifically with respect to the particular employees that work in such roles within the organization.

To specify the set of participants and/or the set of delegates, the computing system (e.g., computing system 110) according to example embodiments described herein can use the above-described defined query language to query one or more object graphs having organizational data that respectively corresponds to one or more organizations that employ the set of participants and/or the set of delegates. In these or other example embodiments, the object graph(s) can include objects that respectively correspond to each participant in the set of participants and/or objects that respectively correspond to each delegate in the set of delegates. In one embodiment, the computing system can use the defined query language to run queries against such object graph(s) and/or the objects therein to access, read, analyze, and/or retrieve data (e.g., attribute values) in the plurality of objects that allow the computing system to identify the set of participants and/or the set of delegates (e.g., by identifying objects having a common attribute value(s)).

In one embodiment, the computing system (e.g., computing system 110) can run such queries to identify the set of participants by identifying a common attribute (e.g., attribute value) across multiple objects that indicates that each object corresponds to an employee working in a "team member" role within an organization. In this or another embodiment, by identifying such a common attribute (e.g., attribute value) across such multiple objects, the computing system can thereby identify the set of participants that it can then specify in the survey data object. In another embodiment, the computing system (e.g., computing system 110) can run such queries to identify the set of delegates by identifying a common attribute (e.g., attribute value) across multiple objects that indicates that each object corresponds to an employee working in a "team manager" role within an organization. In this or another embodiment, by identifying such a common attribute (e.g., attribute value) across such multiple objects, the computing system can thereby identify the set of delegates that it can then specify in the survey data object.

In at least one embodiment, the computing system (e.g., computing system 110) can grant survey access rights to each participant of the set of participants such that they can each individually access the survey and provide their discrete survey responses. In this or another embodiment, the computing system can grant such survey access rights to each participant by generating a survey distribution object (also referred to herein as, "distribution object") that grants each participant permission to view the questions of the survey and provide responses. In this or another embodiment, the computing system can generate the survey distribution object such that it specifies the set of participants (e.g., specifies the "team member" role) and/or includes instructions that, when executed by the computing system, cause the computing system to distribute the survey to the set of participants and allows each participant to access the survey and provide a survey response. In some embodiments, the computing system can store the survey distribution object in one or more of the object graphs described above.

According to one or more example embodiments, the computing system (e.g., computing system 110) can grant a delegate in the set of delegates access rights to view survey responses of certain participants in the set of participants based on a relationship between the delegate and each of such certain participants. For example, in at least one embodiment, to grant such access rights to the delegate, the computing system can define a data access rule (also referred to herein as, "survey data access rule") that specifies a subset of participants in the set of participants that are constituents of the delegate. For instance, in this or another embodiment, the computing system can define the data access rule such that it specifies the "team manager" role of the delegate and the "team member" role of each participant in the subset of participants. In this or another embodiment, the relationship between the delegate and each participant is defined by the "team manager" and "team member" role designations, which further defines each participant in the subset of participants as a constituent of the delegate. That is, for instance, in this or another embodiment, the computing system can define the data access rule such that it specifies a general relationship (e.g., a general employment relationship) between the delegate and the constituents (e.g., each of the constituents).

In some embodiments, the computing system can define the above-described data access rule such that it references one or more object graphs. For example, in these or other embodiments, the computing system can define the data access rule such that it includes a reference (e.g., an identifier, a pointer) to a certain object graph, certain object(s) therein, and/or certain data (e.g., attribute values) in such certain object(s). In some embodiments, the computing system can define the data access rule such that it includes instructions for the computing system to access and/or traverse (e.g., using a defined query language as described below) a certain object graph to perform one or more operations in accordance with one or more embodiments of the present disclosure.

In some embodiments, the computing system (e.g., computing system 110) can define such a data access rule in, for example, a database that can be stored (e.g., in memory) and referenced by the computing system (e.g., at runtime) to determine whether the delegate can access survey responses of the delegate's constituents. In some embodiments, the computing system can define such a data access rule in an object such as, for instance, a survey delegation object (also referred to herein as, "delegation object"). For example, in these or other embodiments, the computing system can define the data access rule in the survey delegation object by specifying, in the survey delegation object, the "team manager" role of the delegate (e.g., by specifying a "isDelegate (role)" function) and the "team member" role of each participant in the subset of participants (e.g., by specifying a "isDelegateFor(role,constituent)" function).

In some embodiments, the computing system (e.g., computing system 110) can include (e.g., specify, define) instructions in the above-described survey delegation object that, when executed by the computing system, can cause the computing system to perform one or more operations that allow the delegate access to view the survey responses of the delegate's constituents. For example, in these or other embodiments, the computing system can include (e.g., specify, define) instructions that, when executed by the computing system, can cause the computing system to filter the survey response data to extract the constituent response data from the survey response data (e.g., as described below) and provide the constituent response data to the delegate. In some embodiments, the computing system can store the survey delegation object in one or more of the object graphs described above.

In the above embodiments, it should be appreciated that the constituent group takes the delegate's "team manager" role (e.g., the "isDelegate(role)" function) as the base object such that the constituent group is not a static set of roles but rather a function: (delegate)=>participants (e.g., the "isDelegateFor(role, constituent)" function). In these embodiments, it should also be appreciated that by defining the data access rule such that it specifies the role of the delegate (e.g., "team manager") and the role of each constituent (e.g., "team member"), the computing system can thereby generate the survey delegation object such that it can be applied universally with respect to the delegate role and the constituent role, rather than applied specifically with respect to the particular employees that work in such roles within the organization.

According to at least one embodiment, the computing system (e.g., computing system 110) can receive, from the delegate, a request to access survey response data. For example, this or another embodiment, the computing system can receive (e.g., via a network such as, for instance, the Internet) a request from the delegate (e.g., from a computing and/or communication device associated with the delegate) to access survey responses (e.g., survey response data) that have been submitted by the constituents of the delegate. In this or another embodiment, based in part on (e.g., in response to) receipt of such a request from the delegate, the computing system can evaluate the data access rule described above to identify the constituents of the delegate.

For instance, in one embodiment, to identify the constituents of the delegate, the computing system can access, read, analyze, and/or retrieve (e.g., write) the data access rule that can be in a database that can be stored (e.g., in memory) as described above. In another embodiment, to identify the constituents of the delegate, the computing system can use the above-described defined query language to run a query against an object graph that can include the survey delegation object, where such a query can allow the computing system to access, read, analyze, and/or retrieve (e.g., write) the data access rule that can be in the survey delegation object. In some embodiments, the computing system can use the defined query language to implement instructions in the survey delegation object that can allow the computing system to grant the delegate access to the survey responses (e.g., survey response data) of the delegate's constituents.

In some embodiments, the computing system (e.g., computing system 110) can generate the above-described survey delegation object based at least in part on (e.g., in response to) receiving the request from the delegate to access the survey response data. In these or other embodiments, based at least in part on (e.g., in response to) receiving the delegate's request to access the survey response data, the computing system can generate the survey delegation object described above such that it specifies, for instance: the survey (e.g., the survey title); the delegate (e.g., the "team manager" role of the delegate and/or a "isDelegate(role)" function); and/or the constituents of the delegate (e.g., the "team member" role of each participant in the subset of participants and/or a "isDelegateFor(role,constituent)" function).

In some embodiments, the computing system (e.g., computing system 110) can include (e.g., specify, define) the above-described instructions in the survey delegation object that, when executed by the computing system, can cause the computing system to perform one or more operations that allow the delegate access to view the survey responses of the delegate's constituents. For example, in these or other embodiments, the computing system can include (e.g., specify, define) instructions that, when executed by the computing system, can cause the computing system to filter the survey response data to extract the constituent response data from the survey response data (e.g., as described below) and provide the constituent response data to the delegate.

In at least one embodiment, based at least in part on (e.g., in response to) receiving the request from the delegate to access the survey response data, the computing system (e.g., computing system 110) can implement the survey delegation object to extract the constituent response data from the survey response data and provide the constituent response data to the delegate. For example, in this or another embodiment, when the computing system receives the delegate's request to access the survey response data and subsequently generates the survey delegation object, the computing system can then implement the survey delegation object by, for instance, executing the instructions in the survey delegation object that can cause the computing system to filter the survey response data to extract the constituent response data from the survey response data (e.g., as described below) and provide the constituent response data to the delegate.

In accordance with at least one example embodiment, the computing system (e.g., computing system 110) can filter the survey response data (e.g., the survey responses submitted by all participants) to extract constituent response data corresponding to the constituents of the delegate. For example, in this or another example embodiment, the computing system can generate a survey response object for each survey response received from each participant. In this or another example embodiment, each survey response object can include data (e.g., attribute values) that can be indicative of a certain survey response submitted by a certain participant. In this or another example embodiment, each survey response object can specify the role of the participant that submitted the survey response (e.g., the "team member" role and/or the "isDelegateFor(role, constituent)" function). In this or another example embodiment, the computing system can store each survey response object in one or more of the object graphs described above. In some embodiments, to filter the survey response data to extract the constituent response data of the delegate's constituents, the computing system can use the above-described defined query language to run a query against one or more object graphs that can include the survey response objects described above. For instance, in these or other embodiments, the computing system can run such a query to identify and/or extract (e.g., read, write) survey response objects that correspond to the delegate's constituents, thereby allowing the computing system to filter the survey response data (e.g., the survey responses submitted by all participants) and extract constituent response data corresponding to the constituents of the delegate.

In at least one embodiment, the computing system (e.g., computing system 110) can return (e.g., provide) the constituent response data to the delegate. For example, in this or another embodiment, the computing system can send the constituent response data (e.g., constituent survey responses) to the delegate (e.g., to a computing and/or communication device associated with the delegate) over a network (e.g., via the Internet). In some embodiments, the computing system can render (e.g., via a graphical user interface (GUI)) the constituent response data on a display device (e.g., a monitor, screen, display) that can be coupled (e.g., communicatively, operatively) with the computing system such that the delegate can view such constituent response data via the display device.

In some embodiments, the computing system (e.g., computing system 110) can generate the above-described survey data object and/or define the above-described data access rule such that either or both specify an anonymity threshold criterion that is to be satisfied before the computing system provides the constituent response data to the delegate. For example, the anonymity threshold criterion can constitute a minimum quantity of survey responses (e.g., 3, 5, 10) that are to be submitted by the delegate's constituents before the delegate can view the constituent response data in the constituents' responses. In additional or alternative embodiments, the anonymity threshold criterion can specify a defined quantity of the constituents (e.g., a minimum quantity of the constituents) that are to respectively provide survey responses (e.g., survey response data) for the survey before the computing system provides the constituent response data to the delegate. In some embodiments, the computing system can generate the above-described survey data object and/or define the above-described data access rule such that either or both specify the set of delegates, the set of participants, and/or the constituents without identifying any of the delegates, participants, or constituents (e.g., without including the names or other identification data of any of the delegates, participants, or constituents).

According to one or more embodiments, the computing system (e.g., computing system 110) can define a survey distribution rule that specifies a trigger event that can be associated with the survey, the set of participants, the set of delegates, and/or the constituents. For example, in some embodiments, the computing system can define the survey distribution rule such that it specifies a trigger event such as, for instance, a new hire event (e.g., when a new employee is hired by an organization), a separation event (e.g., when an employee leaves an organization), a promotion event (e.g., when an employee is promoted to a new role within an organization), a survey update event (e.g., when an existing survey and/or a previously distributed survey has been updated to add or remove one or more survey questions), and/or another trigger event.

In some embodiments, the computing system (e.g., computing system 110) can define such a survey distribution rule in, for example, a database that can be stored (e.g., in memory) and referenced by the computing system (e.g., at runtime) to determine whether the trigger event has occurred. In some embodiments, the computing system can define such a survey distribution rule in an object such as, for instance, a survey distribution object. For example, in these or other embodiments, the computing system can define the survey distribution rule in the survey distribution object by specifying, in the survey distribution object, the survey (e.g., the survey title) and each participant in the set of participants that is to receive the survey when the trigger event occurs (e.g., specifying the "team member" role of each participant in the set of participants that is to receive the survey when the trigger event occurs). In some embodiments, the computing system can store the survey distribution object in one or more of the object graphs described above.

In some embodiments, the computing system (e.g., computing system 110) can include (e.g., specify, define) instructions in the survey distribution object that, when executed by the computing system, can cause the computing system to distribute the survey to such participant(s) and allow them to access the survey and provide survey responses. In embodiments where the survey distribution rule is defined in a database as described above, the computing system can include such instructions in the survey distribution rule such that they can be accessed and used by the computing system to distribute the survey to such participant(s) and allow them to access the survey and provide survey responses.

In at least one embodiment, based at least in part on (e.g., in response to) occurrence of the trigger event, the computing system (e.g., computing system 110) can distribute the survey to one or more participants in the set of participants. For example, in this or another embodiment, when the computing system detects (e.g., via a workflow engine) that a trigger event has occurred (e.g., based on evaluation of the survey distribution rule), the computing system can distribute (e.g., via the Internet) the survey to one or more computing and/or communication devices (e.g., smart phone, computer, laptop, tablet) respectively associated with one or more participants in the set of participants. For instance, in this or another embodiment, when the computing system detects that a trigger event has occurred, the computing system can implement the survey distribution object (e.g., execute the instructions in the survey distribution object) to distribute (e.g., via the Internet) the survey to such computing and/or communication device(s) respectively associated with one or more participants in the set of participants.

In some embodiments, the computing system (e.g., computing system 110) can generate the above-described survey distribution object based at least in part on (e.g., in response to) the occurrence of the trigger event. For example, in some embodiments, the computing system can define the above-described survey distribution rule in, for instance, a database that can be stored (e.g., in memory) and referenced by the computing system (e.g., at runtime via a workflow engine) to determine whether the trigger event has occurred. In these or other embodiments, based at least in part on (e.g., in response to) detecting the trigger event (e.g., via a workflow engine), the computing system can generate the survey distribution object described above such that it specifies, for instance: the survey (e.g., the survey title); each participant in the set of participants that is to receive the survey when the trigger event occurs (e.g., specifying the "team member" role of each participant in the set of participants that is to receive the survey when the trigger event occurs); and/or a lifecycle of the survey (e.g., a date and/or time at which the survey, or a portion thereon, is to be "open" and "closed").

In some embodiments, the computing system can include (e.g., specify, define) the above-described instructions in the survey distribution object that, when executed by the computing system, can cause the computing system to distribute the survey to computing and/or communication device(s) respectively associated with such participant(s) and allow them to access the survey and provide survey responses. In at least one embodiment, based at least in part on (e.g., in response to) detecting that a trigger event has occurred and generating the survey distribution object, the computing system can implement the survey distribution object (e.g., execute the instructions in the survey distribution object) to distribute (e.g., via the Internet) the survey to such computing and/or communication device(s) respectively associated with one or more participants in the set of participants.

According to one or more embodiments, the computing system (e.g., computing system 110) can define a survey response rule that specifies a defined survey response that triggers execution of at least one operation based at least in part on (e.g., in response to) detection of the defined survey response in the survey response data. For example, in some embodiments, the computing system can define the survey response rule such that it specifies the defined survey response to be a certain answer provided in a survey response (e.g., survey response data) submitted by a participant in the set of participants or a constituent of a delegate (e.g., in some embodiments, the participant and the constituent can be the same entity). In these or other embodiments, the computing system can define the survey response rule such that it specifies the at least one operation to be, for instance: executing a certain workflow (e.g., an automated and/or computer-implemented workflow); generating and/or sending a notification (e.g., a message, electronic mail (e-mail), text message) that can include data that can be indicative of the defined survey response itself and/or the detection thereof; sending such a notification to a certain entity in an organization; and/or another operation.

In some embodiments, the computing system (e.g., computing system 110) can define such a survey response rule in, for example, a database that can be stored (e.g., in memory) and referenced by the computing system (e.g., at runtime) to determine whether any of the survey responses (e.g., survey response data) provided by the set of participants or the constituents includes the defined survey response. In some embodiments, the computing system can define such a survey response rule in an object such as, for instance, the above-described survey response object and/or one or more other survey objects described herein (e.g., the survey data object, survey delegation object, survey distribution object). For example, in these or other embodiments, the computing system can define the survey response rule in the survey response object by specifying, in the survey response object, the survey (e.g., the survey title), the defined survey response (e.g., a certain answer), and the at least one operation that is to be executed based at least in part on (e.g., in response to) detection of the defined survey response in any of the survey responses (e.g., survey response data).

In some embodiments, the computing system (e.g., computing system 110) can include (e.g., specify, define) instructions in the survey response object that, when executed by the computing system, can cause the computing system to perform the at least one operation that is to be executed based at least in part on (e.g., in response to) detection of the defined survey response in any of the survey responses (e.g., survey response data). In embodiments where the survey response rule is defined in a database as described above, the computing system can include such instructions in the survey response rule such that they can be accessed and used by the computing system to execute the at least one operation when the defined survey response is detected in a survey response (e.g., survey response data).

In at least one embodiment, based at least in part on (e.g., in response to) detecting the defined survey response in a survey response (e.g., survey response data), the computing system (e.g., computing system 110) can perform the at least one operation. For example, in this or another embodiment, when the computing system detects (e.g., via a workflow engine) that a survey response (e.g., survey response data) includes the defined survey response (e.g., based on evaluation of the survey response rule), the computing system can execute the above-described instructions that, when executed by the computing system, can cause the computing system to perform the at least one operation that is to be executed based at least in part on (e.g., in response to) detection of the defined survey response in a survey response (e.g., survey response data).

According to at least one embodiment, the computing system (e.g., computing system 110) can define a survey lifecycle rule that specifies one or more lifecycle states of the survey and/or one or more portions (e.g., section(s)) thereof. For example, in this or another embodiment, the computing system can define the survey lifecycle rule such that it specifies one or more lifecycle states such as, for instance, a draft state, a scheduled state, an open state, a closed state, an archived state, and/or another lifecycle state. In this or another embodiment, the computing system can define the one or more lifecycle states of the survey based on (e.g., depending on) a combination of: a publication status or an archive status of the survey (e.g., depending on whether the survey has been published or archived); and one or more survey distribution windows defined for the survey (e.g., depending on what the one or more survey distribution windows have been set to). Accordingly, in this or another embodiment, a survey can be in one of such lifecycle states depending on whether the survey has been published or archived and depending on what the one or more survey distribution windows have been set to. In at least one embodiment, the computing system can reference (e.g., at runtime) the survey lifecycle rule to facilitate completion and review of the survey, including dynamic restriction of a delegate's access to survey responses provided by constituents of the delegate based on the delegate's relationship with each constituent. For example, in some embodiments, the computing system can reference (e.g., at runtime) the survey lifecycle rule to determine the lifecycle state of the survey and/or update the lifecycle state of the survey.

In some embodiments, the computing system (e.g., computing system 110) can define such a survey lifecycle rule in, for example, a database that can be stored (e.g., in memory) and referenced by the computing system (e.g., at runtime) to determine which lifecycle state a survey is in. In some embodiments, the computing system can define such a survey lifecycle rule in an object such as, for instance, a survey state object (also referred to herein as, "state object"). For example, in these or other embodiments, the computing system can define the survey lifecycle rule in the survey state object by specifying, in the survey state object, one or more of the above-described lifecycle states (e.g., "draft," "scheduled," "open," "closed," "archived").

In some embodiments, the computing system (e.g., computing system 110) can include (e.g., specify, define) instructions in the above-described survey state object that, when executed by the computing system, can cause the computing system to perform one or more operations associated with the survey and/or one or more of the lifecycle states of the survey. For example, in these or other embodiments, the computing system can include (e.g., specify, define) instructions that, when executed by the computing system, can cause the computing system to one or more operations such as, for instance, publish a survey (e.g., distribute the survey to one or more participants), re-publish the survey, archive the survey, and/or another operation. In some embodiments, the computing system can store the survey state object in one or more of the object graphs described above.

Example embodiments of the present disclosure are further directed to the above-described organizational management platform. For example, as described above, in some embodiments, the organizational management platform can employ the above-described computing system (e.g., computing system 110) to control and/or leverage organizational data that can be used by the computing system to manage organizational applications such as payroll, operations, human resources (e.g., onboarding and offboarding), benefits, information technology (IT) and device management, third-party application integration and access, and/or another organization application. In these or other embodiments, the organizational management platform can hold (e.g., via computing system 110), for each of one or more organizations, a centralized set of organizational data that acts as a single, centralized system of record for all organizational management processes for that organization. In these or other embodiments, each organization can include a number of entities (e.g., users) which are able to access and interact with the organizational management platform. In these or other embodiments, some entities can have administrative permissions which define whether the entity is able to access and/or modify certain types of organizational data for their organization.

According to at least one embodiment, the organizational data for each organization can include data directly entered into the organizational management platform (e.g., via computing system 110) and/or can include data retrieved, pulled, and/or otherwise obtained (e.g., via computing system 110) from one or more first party and/or third-party applications with which the organizational management platform can have varying levels of integration. In this embodiment, such ingestion and storage of data from third-party applications is in contrast to systems which simply sit on top of third-party applications and apply rules at runtime. In some embodiments, the organizational management platform can provide (e.g., via computing system 110) an entity with the ability (e.g., by configuring Simple Mail Transfer Protocol (SMTP) settings) to configure the cadence or periodicity at which the organizational management platform receives or ingests data (e.g., via comma-separated values (csv) files) from third-party applications.

The organizational data can, in some embodiments, be held (e.g., via computing system 110) as one or more object databases. For example, in these embodiments, multiple object classes can be defined (e.g., via computing system 110) in the object database(s). Example object classes can include employees, devices, job candidates, benefits policies, documents, pay instances, time cards, and/or other objects. In at least one embodiment, for each object, values can be provided and maintained (e.g., via computing system 110) for one or more attributes, such as location, role, salary, and/or another attribute. In this or another embodiment, links can be made between different objects (e.g., via computing system 110). For example, one or more device objects can be associated with one or more employee objects.

The object database(s) according to example embodiments of the present disclosure can be represented as and/or can store data which can be represented as and/or structured as one or more graphs (also referred to herein as, "object graphs") having nodes that correspond to objects and edges that correspond to links or logical associations between objects and/or object attribute(s). In these or other example embodiments, such object graph(s) and/or object(s) of the object graph(s) can be traversed (e.g., accessed, analyzed, and/or read via computing system 110) to understand and/or leverage relationships among objects and their attribute(s). In one example embodiment, organizational data of an organization can be synthesized (e.g., via computing system 110) into a single object graph that can include multiple classes of objects and defines complex relationships among objects and their attribute(s). In this or another example embodiment, one or more workflows (e.g., all workflows) associated with the organization and/or one or more departments (e.g., units, divisions) of the organization can be run (e.g., executed) through one platform and one object graph (e.g., the single object graph referenced above). For example, in this or another example embodiment, one or more workflows (e.g., all workflows) associated with, for instance, human resources (HR), accounting, payroll, operations, management, legal, information technology (IT), and/or another workflow can be run (e.g., executed) through the above-described organizational management platform (e.g., via computing system 110) and through (e.g., using) the single object graph described above.

In some embodiments, one or more objects in the object graph described above and/or the data of such object(s) (e.g., attribute value(s) and/or other data in such object(s)) can support execution of and/or otherwise be associated with the workflow(s) described above. Accordingly, in some embodiments, the organizational management platform can (e.g., via computing system 110) access, analyze, read, retrieve, and/or modify the object(s) and/or the data thereof to execute such workflow(s). In additional or alternative embodiments, the organizational management platform can (e.g., via computing system 110) implement (e.g., generate, define, execute) the object(s) and/or the data thereof (e.g., a function, method, process, and/or operation defined in the object(s)) to execute such workflow(s). For example, in these or other embodiments, the object(s) can respectively include one or more instructions (e.g., software components, processing threads) that, when executed by the organizational management platform (e.g., via computing system 110), can cause one or more operations of one or more workflows to be performed.

In some embodiments, the above-described organizational data can include organizational structure data. For example, the organizational structure data can be encoded (e.g., via computing system 110) within links or edges defined between objects of the organizational data and/or can be stored as a separate data layer. For example, the organizational structure data can define organizational relationships between objects, including employee objects. As one example, the organizational structure data can indicate that a first employee object has the relationship of "manager" relative to a second employee object. The organizational relationships can be defined (e.g., via computing system 110) between specific objects and/or groups of objects. As another example, the organizational structure data can indicate that a first group of employees (e.g., the "IT Administrator" group of employees) has a certain set of permissions (e.g., device activation and/or deactivation) relative to a particular group of devices (e.g., the "work laptops" group of the devices).

In one or more example embodiments described herein, the above-described organizational management platform (e.g., via computing system 110) can employ a defined and/or custom computer language such as, for instance, the above-described defined query language to perform (e.g., at configuration time, at runtime, in real time) queries against the organizational data. In some embodiments, as described above, the defined query language can constitute and/or include a domain-specific query language. In at least one embodiment, the organizational management platform (e.g., via computing system 110) can employ the domain-specific query language to perform queries against an object graph and/or objects thereof that can represent and/or include the organizational data. In some embodiments, the organizational management platform (e.g., via computing system 110) can employ the domain-specific query language to perform queries against such an object graph, where such queries can involve traversing (e.g., accessing, analyzing, reading, retrieving, modifying) one or more objects (e.g., attribute values and/or other data in the object(s)) of the object graph. In some embodiments, the organizational management platform (e.g., via computing system 110) can employ the domain-specific query language to perform queries against such an object graph, where such queries can involve implementing (e.g., generating, defining, executing) one or more objects (e.g., a function, method, process, and/or operation defined in the object(s)) of the object graph.

In some embodiments, the organizational management platform (e.g., via computing system 110) can employ the domain-specific query language described above to define functions and/or queries that can return data that satisfies and/or responds to the functions and/or queries, respectively. In some embodiments, the domain-specific query language can constitute and/or include a declarative language. In some embodiments, the domain-specific query language can include organization functions and/or operators that can leverage organizational relationships within organizational data. For example, an organization function defined as "ORG(employee,relationship)" can return one or more employees that have a specified relationship with a specified employee.

It should be appreciated that, in some embodiments, one or more objects in an object graph as described above and/or the data of such object(s) (e.g., attribute value(s) and/or other data in such object(s)) can support execution of and/or otherwise be associated with performing (e.g., via computing system 110) one or more operations described herein in accordance with one or more embodiments of the present disclosure. That is, for instance, the organizational management platform according to example embodiments of the present disclosure can (e.g., via computing system 110) access, analyze, read, retrieve, and/or modify the object(s) and/or the data thereof to perform such operation(s) in accordance with one or more embodiments described herein and/or illustrated in the figures. In additional or alternative embodiments, the organizational management platform can (e.g., via computing system 110) implement (e.g., generate, define, execute) the object(s) and/or the data thereof (e.g., a function, method, process, and/or operation defined in the object(s)) to perform such operation(s) in accordance with one or more embodiments described herein and/or illustrated in the figures. For example, in these or other embodiments, the object(s) can respectively include one or more instructions (e.g., software components, processing threads) that, when executed by the organizational management platform (e.g., via computing system 110), can cause the organizational management platform (e.g., via computing system 110) to perform such operation(s) in accordance with one or more embodiments described herein and/or illustrated in the figures.

It should be appreciated that the computing system (e.g., computing system 110) according to example embodiments described herein can dynamically restrict a viewer's (e.g., a delegate's) access to survey responses to only a subset of responses (e.g., constituent survey responses), based on the viewer's relationship with each of the respondents (e.g., based on the delegate-constituent relationship described herein). In additional or alternative embodiments, the computing system can further configure and/or enforce a configurable anonymity threshold criterion for each viewer (e.g., each delegate) such that when a certain viewer requests access to survey responses, the computing system will only provide the viewer with the subset of responses (e.g., constituent survey responses) if the subset includes a minimum threshold quantity of responses.

Embodiments of the present disclosure can provide numerous technical effects and/or benefits. For example, the disclosed technology can be implemented by the above-described computing system (e.g., computing system 110) according to one or more embodiments of the present disclosure to specify which individuals are viewers for a survey and, as a rule, what the relationship(s) between a viewer and a respondent allows the viewer to access with respect to survey responses received for the survey. It should be appreciated that such functionality according to example embodiments of the present disclosure is unique because the computing system can combine survey data (e.g., survey responses, survey response data) and participant attributes (e.g., used to evaluate the rule) on the server-side (e.g., before the survey and/or the survey response data is retrieved from or transmitted by the computing system). That is, for instance, in these or other example embodiments, the computing system can configure (e.g., define, specify) the viewer authentication and viewer authorization features of a survey (e.g., processes, criteria) before the survey and/or the survey response data (e.g., survey responses) is retrieved from or transmitted by the computing system. In contrast, existing survey management systems require manually exporting data from one system to another to combine them to enable this functionality.

As described above, the disclosed technology can be implemented by the computing system (e.g., computing system 110) according to one or more embodiments of the present disclosure to facilitate survey completion and review, including dynamic restriction of a delegate's access to survey responses provided by constituents of the delegate based on the delegate's relationship with each constituent. Consequently, in these one or more embodiments, the disclosed technology can therefore eliminate the individual creation and/or management by the computing system of different survey response permission rules (e.g., survey response access rights and/or privileges) respectively corresponding to various delegates (e.g., various employees of an organization working in a "team manager" role in the organization). Further, in these one or more embodiments, by eliminating the individual creation and/or management by the computing system of such different survey response permission rules respectively corresponding to such various delegates, the disclosed technology can facilitate improved efficiency, improved capacity, improved performance, and/or reduced computational costs of the computing system and/or one or more processors that can be included with and/or employed by the computing system to, for example, execute one or more operations described herein in accordance with at least one embodiment of the present disclosure.

According to one or more embodiments of the present disclosure, the disclosed technology described herein can provide further technical effects and/or benefits including an improvement in the creation and/or dynamic application of survey data access rules to various entities associated with an organization and/or a computing environment. In particular, in example embodiments, the disclosed technology can assist an entity (e.g., an administrator of organizational data) in performing a technical task by way of a continued and/or guided human-machine interaction process in which the entity can interact with an entity interface (e.g., a GUI) that can be used to facilitate the creation and/or dynamic application of survey data access rules to various entities (e.g., the above-described delegates) associated with an organization and/or a computing environment (e.g., a computing system and/or computing network operated and/or implemented by an organization). Furthermore, in various embodiments, the disclosed technology can also provide benefits including improvements in computing resource usage efficiency, security, and ease of use.

In accordance with at least one example embodiment of the present disclosure, the disclosed technology can further provide a variety of technical effects and benefits with respect to the efficiency of utilizing computing resource usage by increasing the accuracy associated with the creation, dynamic application, and/or management of survey data access rules corresponding to multiple entities of an organization and/or a computing environment. For instance, by facilitating the creation and/or dynamic application of a survey data access rule to a certain "role" within an organization (e.g., a "team manager" role of a delegate as described above) rather than a certain "employee" of the organization, the amount of storage space associated with storing a plurality of survey data access rules respectively corresponding to various employees of the organization can be reduced, thereby improving storage capacity of one or non-transitory computer-readable media used to store such survey data access rules.

Further, any of the above-described technical effects and/or benefits of the disclosed technology can also improve the effectiveness of a wide variety of devices and/or services including, for instance, any devices and/or services that rely on the disclosed technology. Accordingly, the improvements offered by the disclosed technology can result in tangible benefits to a variety of applications, devices, and/or systems including mechanical, electronic, and computing systems associated with the creation and/or management of permission rules corresponding to different entities associated with a computing environment.

According to some embodiments, a practical application of the disclosed technology is that the computing system (e.g., computing system 110) can send an engagement survey to all employees of an organization, where the computing system can configure the survey such that any manager of the organization can view responses for their direct and indirect reports. In additional or alternative embodiments, the computing system can define one or more anonymity features to the survey and/or survey responses that can allow the computing system to remove names of respondents from survey responses and/or roll survey responses into buckets of a minimum size before displaying any survey responses to a manager. For example, in these or other embodiments, the anonymity feature can include and/or constitute a minimum threshold of survey responses such as, for instance, 3 survey responses, so managers with less than 3 survey responses from direct or indirect reports cannot access any survey response data.

Another practical application of the disclosed technology according to at least one embodiment is that, upon satisfaction of the minimum threshold of survey responses, the manager can then view and/or use at least some of the survey response data (e.g., data in the direct or indirect reports) to engineer, design, and/or implement another system and/or process based on such survey response data. For example, the manager can engineer, design, and/or implement one or more systems (e.g., computer-based system(s)) and/or processes (e.g., computer-implemented process(es)) to create, improve, delete, and/or otherwise alter, for instance, a device (e.g., computing device), a system (e.g., a computing system), and/or a process (e.g., a workflow, computer-implemented workflow) of the organization based on the feedback in the survey response data.

With reference to the figures, example embodiments of the present disclosure are described below in further detail.

FIG. 1 depicts a block diagram of an example, non-limiting computing environment 100 that can facilitate survey completion and review in accordance with one or more example embodiments of the present disclosure. In the example embodiment depicted in FIG. 1, computing environment 100 can include a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and/or instructions 160.

Network 102 according to one or more embodiments of the present disclosure can include any type of communications network. For example, in some embodiments, network 102 can include a local area network (LAN), a wide area network (WAN), an intranet, an extranet, and/or the Internet. Further, in at least one embodiment, network 102 can include any number of wired or wireless connections and/or links that can be used to communicate with one or more systems (e.g., computing system 110 and/or remote computing system 130) and/or one or more devices (e.g., one or more computing devices 152). Communication over network 102 according to one or more embodiments of the present disclosure can be performed via any type of wired and/or wireless connection and/or can use a wide variety of communication protocols (e.g., TCP/IP, HTTP, SMTP, FTP), encodings or formats (e.g., HTML, XML), and/or protection schemes (e.g., VPN, secure HTTP, SSL).

Computing system 110 according to one or more embodiments of the present disclosure can include any combination of systems and/or devices including one or more computing systems and/or one or more computing devices. Further, in some embodiments, computing system 110 can be connected (e.g., networked) to one or more computing systems and/or one or more computing devices via network 102. Computing system 110 can operate in various different configurations including as a server or a client machine in client-server network environment, or as a peer machine in a peer-to-peer (or distributed) network environment. Though computing system 110 is depicted in FIG. 1 as a single device, computing system 110 according to one or more embodiments of the present disclosure can include any collection or combination of devices that individually or in combination with other devices, execute a set of one or more instructions to perform any one or more of the operations discussed herein.

In this example, computing system 110 can include one or more computing devices 112, which can include any type of computing device. For example, one or more computing devices 112 can include a personal computing device (e.g., a desktop computing device), a mobile computing device (e.g., a smartphone or tablet), a wearable computing device (e.g., a smartwatch), an embedded computing device, a web appliance, a server, a network router, a switch, a bridge, or any device capable of executing a set of instructions (e.g., any combination of instructions which can include sequential instructions and/or parallel instructions) associated with one or more operations and/or one or more actions to be performed by computing system 110 or any of the constituent components and/or devices of computing system 110.

As illustrated in the example embodiment depicted in FIG. 1, one or more computing devices 112 can include one or more processors 114. In at least one embodiment described herein, one or more processors 114 can be and/or include any processing device (e.g., a processor core, a microprocessor, an application-specific integrated circuit (ASIC), a field-programmable gate array (FPGA), a controller, or a microcontroller) and can include one processor or a plurality of processors that can be coupled to one another (e.g., operatively connected). In some embodiments, one or more processors 114 can include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

In at least one embodiment of the present disclosure, one or more computing devices 112 can include one or more memory devices 116. In these one or more embodiments, one or more memory devices 116 can be used to store data and/or information and can include one or more computer-readable media, one or more non-transitory computer-readable media, one or more non-transitory computer-readable storage media, and/or one or more machine-readable media. Though one or more memory devices 116 are depicted in FIG. 1 as a single unit (e.g., a single medium), the computer-readable storage media according to one or more embodiments of the present disclosure can include a single medium or multiple media (e.g., a centralized or distributed database, and/or associated caches and servers) that can store one or more sets of instructions. Further, in these one or more embodiments, the computer-readable storage media can include any medium that can: store, encode, and/or carry a set of instructions to be executed by a computing device; and/or cause the computing device to perform any of the one or more operations described herein. In some embodiments, the computer-readable storage media can include one or more solid-state memories, one or more optical media, and/or one or more magnetic media. In at least one embodiment described herein, one or more memory devices 116 can include, for instance, random access memory (RAM), read only memory (ROM), erasable programmable read only memory (EPROM), electrically erasable programmable read only memory (EEPROM), one or more flash memory devices, one or more magnetic storage devices (e.g., one or more hard disk drives), and/or another type of memory device.

In accordance with at least one embodiment described herein, one or more processors 114 can be configured to execute one or more instructions to perform the operations described herein including, for example, one or more operations associated with survey completion and review. For instance, in this or another embodiment, one or more processors 114 can be configured to execute one or more instructions to perform the operations described herein including, for example, one or more operations associated with dynamic restriction of a delegate's access to survey responses provided by constituents of the delegate based on the delegate's relationship with each constituent. Further, one or more memory devices 116 can store data 118 and/or instructions 120, which can be executed by one or more processors 114 to cause one or more computing devices 112 to perform one or more operations.

Data 118 according to one or more embodiments of the present disclosure can include organizational data. For example, in at least one embodiment, data 118 can include organizational data associated with one or more entities of an organization (e.g., data associated with one or more employees of a company). Further, in one or more embodiments, instructions 120 can include one or more instructions to use data including data 118 to perform the one or more operations described herein. In some embodiments, one or more memory devices 116 can be used to store one or more applications that can be operated by one or more processors 114. In at least one embodiment described herein, data 118, instructions 120, and/or the one or more applications can be associated with an organization (e.g., a company). Further, in some embodiments, computing system 110 can be configured to manage the one or more applications. For example, in these embodiments, computing system 110 can perform one or more operations associated with survey completion and review. For instance, in these or other embodiments, computing system 110 can perform one or more operations associated with dynamic restriction of a delegate's access to survey responses provided by constituents of the delegate based on the delegate's relationship with each constituent.

Data 118 can, in some embodiments, be held and/or structured as one or more object databases. For example, in at least one embodiment, data 118 can be structured as an object database having one or more object classes defined therein. In some embodiments, such one or more object classes can include, for instance, employees, devices, job candidates, benefits policies, documents, pay instances, time cards, and/or another object class. In these embodiments, the object database can include a plurality of objects that can each be classified and/or otherwise associated with the one or more object classes described above. In these embodiments, each object of the plurality of objects can include one or more attributes such as, for instance, location, role, salary, and/or another attribute, where each of such one or more attributes can have a corresponding value. In some embodiments, data 118 can be structured as an object database that can include one or more objects that can each have zero, one, or more links to zero, one, or more other object(s). For example, one or more device objects can each be associated with one or more employee objects.

As illustrated in the example embodiment depicted in FIG. 1, one or more computing devices 112 can include one or more input devices 122 and/or one or more output devices 124. In accordance with at least one embodiment described herein, one or more input devices 122 can be configured to receive input (e.g., entity input) and can include one or more touch screens, one or more keyboards, one or more pointing devices, (e.g., mouse device), one or more buttons, one or more microphones, and/or one or more cameras. In one or more embodiments of the present disclosure, one or more output devices 124 can include one or more display devices, one or more loudspeaker devices, one or more haptic output devices, and/or another output device. By way of example, in some embodiments, one or more output devices 124 can be used to display a graphical user interface (GUI) via a display device that can include a touch screen layer that can be configured to detect one or more entity inputs.

Remote computing system 130 according to one or more embodiments of the present disclosure can include one or more computing devices 132. In at least one embodiment described herein, one or more computing devices 132 can respectively include one or more processors 134, one or more memory devices 136, data 138, and/or instructions 140. In at least one embodiment of the present disclosure, one or more processors 134, one or more memory devices 136, data 138, and/or instructions 140 can respectively include any of the attributes and/or capabilities of one or more processors 114, one or more memory devices 116, data 118, and/or instructions 120. Further, in one or more embodiments described herein, one or more processors 134 and/or one or more memory devices 136 can each be configured to respectively perform any of the operations performed by one or more processors 114 and/or one or more memory devices 116.

In one or more embodiments of the present disclosure, remote computing system 130 can include any of the attributes and/or capabilities of computing system 110 and/or can be configured to perform any of the operations performed by computing system 110. Further, in at least one embodiment, remote computing system 130 can communicate with one or more devices and/or one or more systems via network 102. Remote computing system 130 according to one or more embodiments of the present disclosure can include one or more applications (e.g., computing software applications) that can be stored and/or executed by remote computing system 130. Further, in some embodiments, the one or more applications can include one or more applications that can be accessed from computing system 110 and/or can be at least partly operated from remote computing system 130. Further, in at least one embodiment, data 138 can include one or more portions of the above-described organizational data.

In one or more embodiments of the present disclosure, one or more computing devices 152 can respectively include one or more processors 154, one or more memory devices 156, data 158, and/or instructions 160. In at least one embodiment of the present disclosure, one or more processors 154, one or more memory devices 156, data 158, and/or instructions 160 can respectively include any of the attributes and/or capabilities of one or more processors 114, one or more memory devices 116, data 118, and/or instructions 120. Further, in one or more embodiments described herein, one or more processors 154 and/or one or more memory devices 156 can each be configured to respectively perform any of the operations performed by one or more processors 114 and/or one or more memory devices 116. In at least one embodiment, one or more computing devices 152 can respectively communicate with one or more devices and/or one or more systems via network 102.

In some embodiments, any of one or more computing devices 152 can include one or more applications (e.g., computing software applications) that can be respectively stored and/or executed by one or more computing devices 152. Further, in some embodiments, the one or more applications can include one or more applications that can be accessed from computing system 110 and/or can be at least partly operated from any of one or more computing devices 152. Further, in at least one embodiment, data 158 can include one or more portions of the above-described organizational data.

Figure 2:
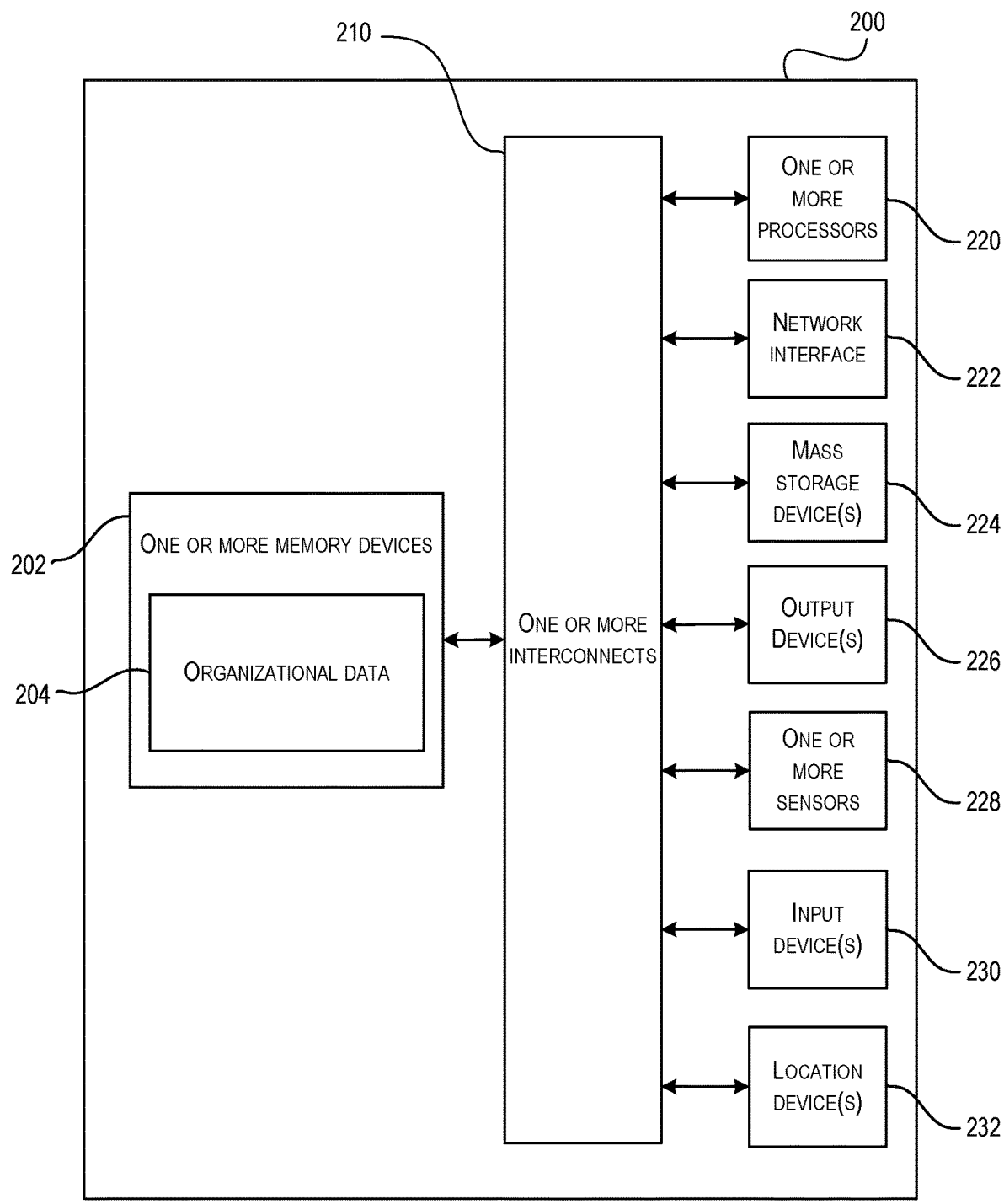
FIG. 2 depicts a block diagram of an example, non-limiting computing device that can facilitate survey completion and review in accordance with one or more example embodiments of the present disclosure.

FIG. 2 depicts a block diagram of an example, non-limiting computing device 200 that can facilitate survey completion and review in accordance with one or more example embodiments of the present disclosure. Computing device 200 according to one or more embodiments of the present disclosure can include one or more attributes and/or capabilities of computing system 110, remote computing system 130, and/or one or more computing devices 152 described above with reference to the example embodiment depicted in FIG. 1. Furthermore, computing device 200 can be configured to perform one or more operations and/or one or more actions that can be performed by computing system 110, remote computing system 130, and/or one or more computing devices 152.

As illustrated in the example embodiment depicted in FIG. 1, computing device 200 can include one or more memory devices 202, organizational data 204, one or more interconnects 210, one or more processors 220, a network interface 222, one or more mass storage devices 224, one or more output devices 226, one or more sensors 228, one or more input devices 230, and/or one or more location devices 232.

In one or more embodiments of the present disclosure, one or more memory devices 202 can store information and/or data (e.g., organizational data 204). Further, in some embodiments, one or more memory devices 202 can include one or more non-transitory computer-readable media and/or one or more non-transitory computer-readable storage media, including RAM, ROM, EEPROM, EPROM, flash memory devices, magnetic disks, and/or combinations thereof. In at least one embodiment, the information and/or data stored by one or more memory devices 202 can be executed by one or more processors 220 to cause computing device 200 to perform operations including one or more operations associated with survey completion and review. For instance, in this or another embodiment, the information and/or data stored by one or more memory devices 202 can be executed by one or more processors 220 to cause computing device 200 to perform operations including one or more operations associated with dynamic restriction of a delegate's access to survey responses provided by constituents of the delegate based on the delegate's relationship with each constituent.

Organizational data 204 according to one or more embodiments of the present disclosure can include one or more portions of data (e.g., data 118, data 138, and/or data 158) and/or instructions (e.g., instructions 120, instructions 140, and/or instructions 160) that can be stored in one or more memory devices 116, one or more memory devices 136, and/or one or more memory devices 156, respectively. Furthermore, in some embodiments, organizational data 204 can include information associated with one or more entities (e.g., role(s) of an entity within an organization, payrolls of an entity, regions associated with the entity). In some embodiments, organizational data 204 can be received from one or more computing systems (e.g., remote computing system 130), where such one or more computing systems can be remote from computing device 200 (e.g., in another room, building, part of town, city, nation).

In one or more embodiments of the present disclosure, one or more interconnects 210 can include one or more interconnects or buses that can be used to send and/or receive one or more signals (e.g., electronic signals) and/or data (e.g., organizational data 204) between components of computing device 200, including one or more memory devices 202, one or more processors 220, network interface 222, one or more mass storage devices 224, one or more output devices 226, one or more sensors 228 (e.g., a sensor array), one or more input devices 230, and/or one or more location devices 232. In some embodiments, one or more interconnects 210 can be arranged or configured in different ways. For example, in at least one embodiment, one or more interconnects 210 can be configured as parallel or serial connections. Further, in one or more embodiments, one or more interconnects 210 can include: one or more internal buses that can be used to connect internal components of computing device 200; and/or one or more external buses that can be used to connect internal components of computing device 200 to one or more external devices (e.g., one or more devices that can be external to computing device 200). By way of example, in at least one embodiment, one or more interconnects 210 can include different interfaces that can include, for instance, Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or another interface that can be used to connect components.

According to one or more embodiments of the present disclosure, one or more processors 220 can include one or more computer processors that can be configured to execute the one or more instructions that can be stored in one or more memory devices 202. For example, in these one or more embodiments, one or more processors 220 can include one or more general purpose central processing units (CPUs), application specific integrated circuits (ASICs), and/or one or more graphics processing units (GPUs). Further, in at least one embodiment, one or more processors 220 can perform one or more actions and/or operations including one or more actions and/or operations associated with, for instance, organizational data 204. In some embodiments, one or more processors 220 can include single or multiple core devices including a microprocessor, microcontroller, integrated circuit, and/or a logic device.

Network interface 222 according to one or more embodiments of the present disclosure can support network communications. In some embodiments, network interface 222 can support communication via networks that can include, for instance, a local area network and/or a wide area network (e.g., the Internet). For example, in at least one embodiment, network interface 222 can allow computing device 200 to communicate with computing system 110 via network 102.

In one or more embodiments of the present disclosure, one or more mass storage devices 224 (e.g., a hard disk drive and/or a solid state drive) can be used to store data that can include, for instance, organizational data 204. One or more output devices 226 according to one or more embodiments of the present disclosure can include one or more display devices (e.g., LCD display, OLED display, Mini-LED display, microLED display, plasma display, and/or CRT display), one or more light sources (e.g., LEDs), one or more loudspeakers, and/or one or more haptic output devices (e.g., one or more devices that are configured to generate vibratory output).

According to at least one embodiment described herein, one or more sensors 228 can be configured to detect various states and/or can include one or more cameras, one or more light detection and ranging (LiDAR) devices, one or more sonar devices, and/or one or more radar devices. Further, in some embodiments, one or more sensors 228 can be used to provide input (e.g., an image of an entity captured using the one or more cameras) that can be used as part of an entity interface (e.g., a GUI) that can be used to, for instance, facilitate survey completion and review. For example, in these or other embodiments, one or more sensors 228 can be used to provide input (e.g., an image of an entity captured using the one or more cameras) that can be used as part of an entity interface (e.g., a GUI) that can be used to, for instance, facilitate dynamic restriction of a delegate's access to survey responses provided by constituents of the delegate based on the delegate's relationship with each constituent. For instance, one or more sensors 228 can be used to authenticate the identity of an entity based on an image of the entity's face that is captured using one or more sensors 228.

In accordance with at least one embodiment described herein, one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that can be used to detect gestures that can trigger one or more operations by computing device 200).

Although one or more memory devices 202 and one or more mass storage devices 224 are depicted separately in FIG. 2, in some embodiments, one or more memory devices 202 and one or more mass storage devices 224 can be regions within the same memory module. Computing device 200 according to one or more embodiments of the present disclosure can include one or more additional processors, memory devices, and/or network interfaces that can be provided separately or on the same chip or board. In some embodiments, one or more memory devices 202 and one or more mass storage devices 224 can include one or more computer-readable media that can include, for instance, non-transitory computer-readable media, RAM, ROM, hard drives, flash drives, and/or another memory device.

One or more memory devices 202 according to one or more embodiments of the present disclosure can store sets of instructions for applications that can include an operating system that can be associated with various software applications and/or data. For example, in at least one embodiment, one or more memory devices 202 can store sets of instructions for one or more applications that can be subject to one or more security policies that can be generated and/or implemented by computing device 200 and/or one or more other computing devices or one or more computing systems. In some embodiments, one or more memory devices 202 can be used to operate and/or execute a general-purpose operating system that can operate on one or more mobile computing devices and/or stationary devices that can include, for example, smartphones, laptop computing devices, tablet computing devices, and/or desktop computers.

The software applications that can be operated and/or executed by computing device 200 in accordance with at least one embodiment described herein can include, for instance, applications associated with computing system 110, remote computing system 130, and/or one or more computing devices 152 described above with reference to the example embodiment depicted FIG. 1. Further, in some embodiments, such software applications that can be operated and/or executed by computing device 200 can include, for instance, native applications, web services, and/or web-based applications.

According to one or more embodiments of the present disclosure, one or more location devices 232 can include one or more devices and/or circuitry that can determine the position of computing device 200. For example, in at least one embodiment, one or more location devices 232 can determine an actual and/or relative position of computing device 200 by using a satellite navigation positioning system (e.g. a global positioning system (GPS), a Galileo positioning system, the GLObal Navigation satellite system (GLONASS), the BeiDou Satellite Navigation and Positioning system), an inertial navigation system, a dead reckoning system, based on an internet protocol (IP) address, by using triangulation and/or proximity to cellular towers or Wi-Fi hotspots, and/or beacons.

Figure 3:
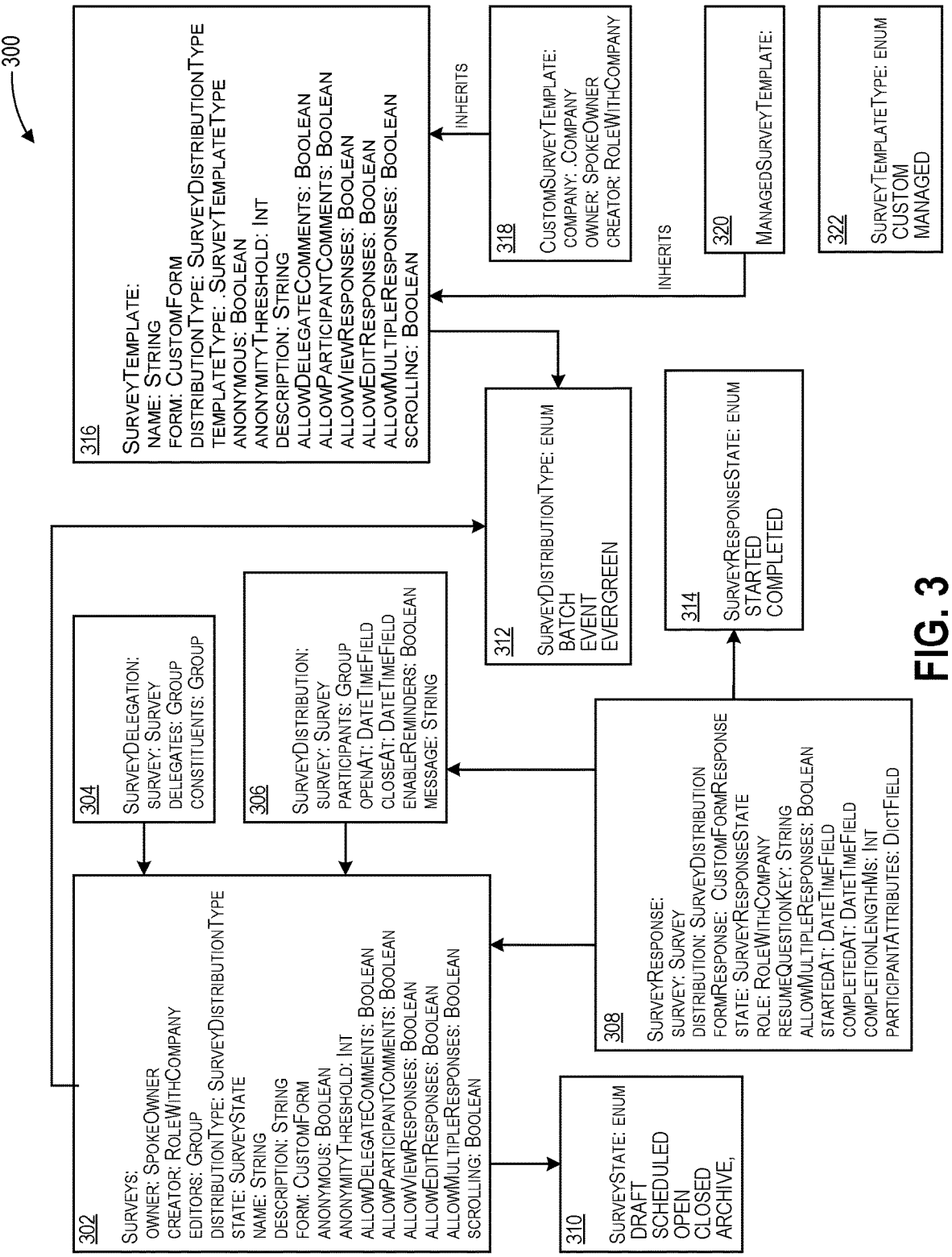
FIG. 3 depicts a block diagram of an example, non-limiting data model that can facilitate survey completion and review in accordance with one or more example embodiments of the present disclosure.

FIG. 3 depicts a block diagram of an example, non-limiting data model 300 that can facilitate survey completion and review in accordance with one or more example embodiments of the present disclosure. A computing device that can be used to generate and/or implement data model 300 can include one or more attributes and/or capabilities of computing system 110, remote computing system 130, one or more computing devices 152, and/or computing device 200. Furthermore, such a computing device can be configured to perform one or more operations and/or one or more actions that can be performed by computing system 110, remote computing system 130, one or more computing devices 152, and/or computing device 200.

In the example embodiment depicted in FIG. 3, data model 300 and/or one or more components thereof can be generated using a modeling language. For example, in one or more embodiments of the present disclosure, computing system 110, remote computing system 130, one or more computing devices 152, and/or computing device 200 can be employed to generate data model 300 and/or one or more components thereof using a modeling language such as, for instance, unified modeling language (UML). Accordingly, in these one or more embodiments, data model 300 can constitute a UML diagram such as, for instance, a UML class diagram. In the example embodiment depicted in FIG. 3, data model 300 can constitute a UML class diagram that illustrates one example design embodiment of how the disclosed technology can be implemented (e.g., via computing system 110) to facilitate survey completion and review. For example, in this or another embodiment, data model 300 can constitute a UML class diagram that illustrates one example design embodiment of how the disclosed technology can be implemented (e.g., via computing system 110) to facilitate dynamic restriction of a delegate's access to survey responses provided by constituents of the delegate based on the delegate's relationship with each constituent in accordance with example embodiments described herein.

In the example embodiment depicted in FIG. 3, data model 300 can include multiple objects. For instance, as illustrated in the example embodiment depicted in FIG. 3, data model 300 can include multiple objects that can include, but are not limited to, a survey object 302 (denoted as "SURVEYS" in FIG. 3), a survey delegation object 304 (denoted as "SURVEYDELEGATION" in FIG. 3), a survey distribution object 306 (denoted as "SURVEYDISTRIBUTION" in FIG. 3), a survey response object 308 (denoted as "SURVEYRESPONSE" in FIG. 3), a survey state object 310 (denoted as "SURVEYSTATE" in FIG. 3), a survey distribution type object 312 (denoted as "SURVEYDISTRIBUTIONTYPE" in FIG. 3), a survey response state object 314 (denoted as "SURVEYRESPONSESTATE" in FIG. 3), a survey template object 316 (denoted as "SURVEYTEMPLATE" in FIG. 3), a custom survey template object 318 (denoted as "CUSTOMSURVEYTEMPLATE" in FIG. 3), a managed survey template object 320 (denoted as "MANAGEDSURVEYTEMPLATE" in FIG. 3), and/or a survey template type object 322 (denoted as "SURVEYTEMPLATETYPE" in FIG. 3). In the example embodiment depicted in FIG. 3, relationships between such objects are represented in data model 300 by the various connector lines.

In at least one embodiment described herein: survey object 302 can include and/or constitute the survey data object described above; survey delegation object 304 can include and/or constitute the survey delegation object described above; survey distribution object 306 can include and/or constitute the survey distribution object described above; survey response object 308 can include and/or constitute the survey response object described above; and/or survey state object 310 can include and/or constitute the survey state object described above.

In accordance with at least one embodiment described herein, data model 300 and/or one or more components thereof can be stored in one or more memory devices. For example, in some embodiments, data model 300 and/or one or more components thereof can be stored in one or more memory devices 116, one or more memory devices 136, one or more memory devices 156, one or more memory devices 202, and/or another memory device. In at least one embodiment described herein, data model 300, survey object 302, survey delegation object 304, survey distribution object 306, survey response object 308, survey state object 310, survey distribution type object 312, survey response state object 314, survey template object 316, custom survey template object 318, managed survey template object 320, and/or a survey template type object 322 can be stored in one or more memory devices 116, one or more memory devices 136, one or more memory devices 156, one or more memory devices 202, and/or another memory device.

Figure 4:
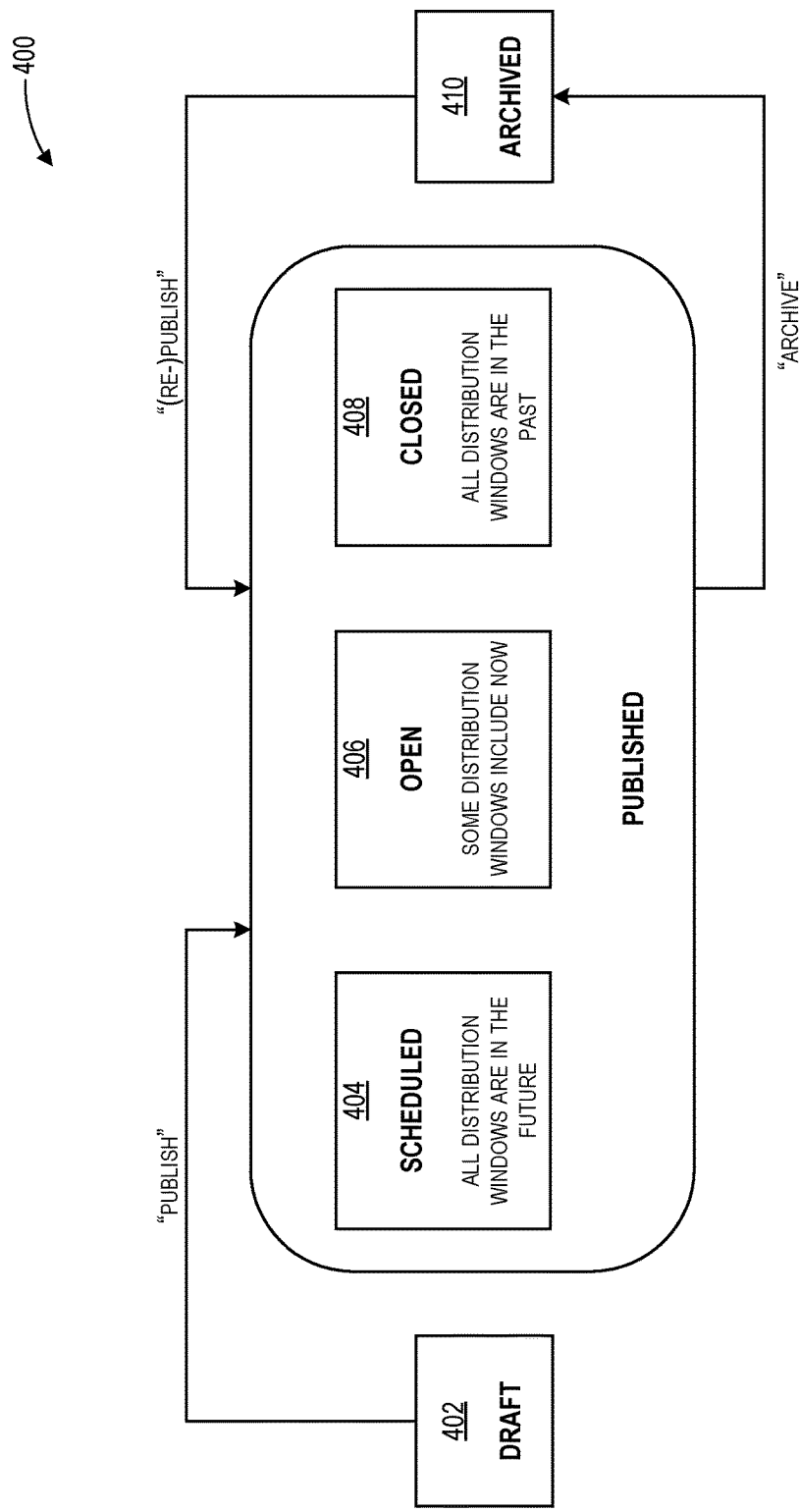
FIG. 4 depicts a block diagram of an example, non-limiting survey lifecycle model that can facilitate survey completion and review in accordance with one or more example embodiments of the present disclosure.

FIG. 4 depicts a block diagram of an example, non-limiting survey lifecycle model 400 that can facilitate survey completion and review in accordance with one or more example embodiments of the present disclosure. In the example embodiment depicted in FIG. 4, survey lifecycle model 400 illustrates one example design embodiment of how the disclosed technology can define and/or specify various lifecycle states of a survey that can be implemented (e.g., via computing system 110) to facilitate survey completion and review. For example, in this embodiment, survey lifecycle model 400 illustrates one example design embodiment of how the disclosed technology can define and/or specify various lifecycle states of a survey that can be implemented (e.g., via computing system 110) to facilitate dynamic restriction of a delegate's access to survey responses provided by constituents of the delegate based on the delegate's relationship with each constituent in accordance with example embodiments described herein.

As illustrated in the example embodiment depicted in FIG. 4, survey lifecycle model 400 can include, for instance: a draft state 402 (denoted as "DRAFT" in FIG. 4); a scheduled state 404 (denoted as "SCHEDULED" in FIG. 4); an open state 406 (denoted as "OPEN" in FIG. 4); a closed state 408 (denoted as "CLOSED" in FIG. 4); and/or an archived state 410 (denoted as "ARCHIVED" in FIG. 4). In at least one embodiment, one or more of the survey lifecycle states illustrated in survey lifecycle model 400 can correspond to the one or more lifecycle states of a survey that can be defined (e.g., via computing system 110) in the survey lifecycle rule described above. For example, in this or another embodiment, draft state 402 can include and/or constitute the draft state described above; scheduled state 404 can include and/or constitute the scheduled state described above; open state 406 can include and/or constitute the open state described above; closed state 408 can include and/or constitute the closed state described above; and/or archived state 410 can include and/or constitute the archived state described above.

In the example embodiment depicted in FIG. 4, although the distribution windows can be valid, they can be ignored when the survey is not published. In this or another embodiment, archiving (e.g., via computing system 110) a survey can cause all distribution windows to be automatically set to end at the current time, so that re-publishing will not inadvertently re-distribute the survey.

Figure 5:
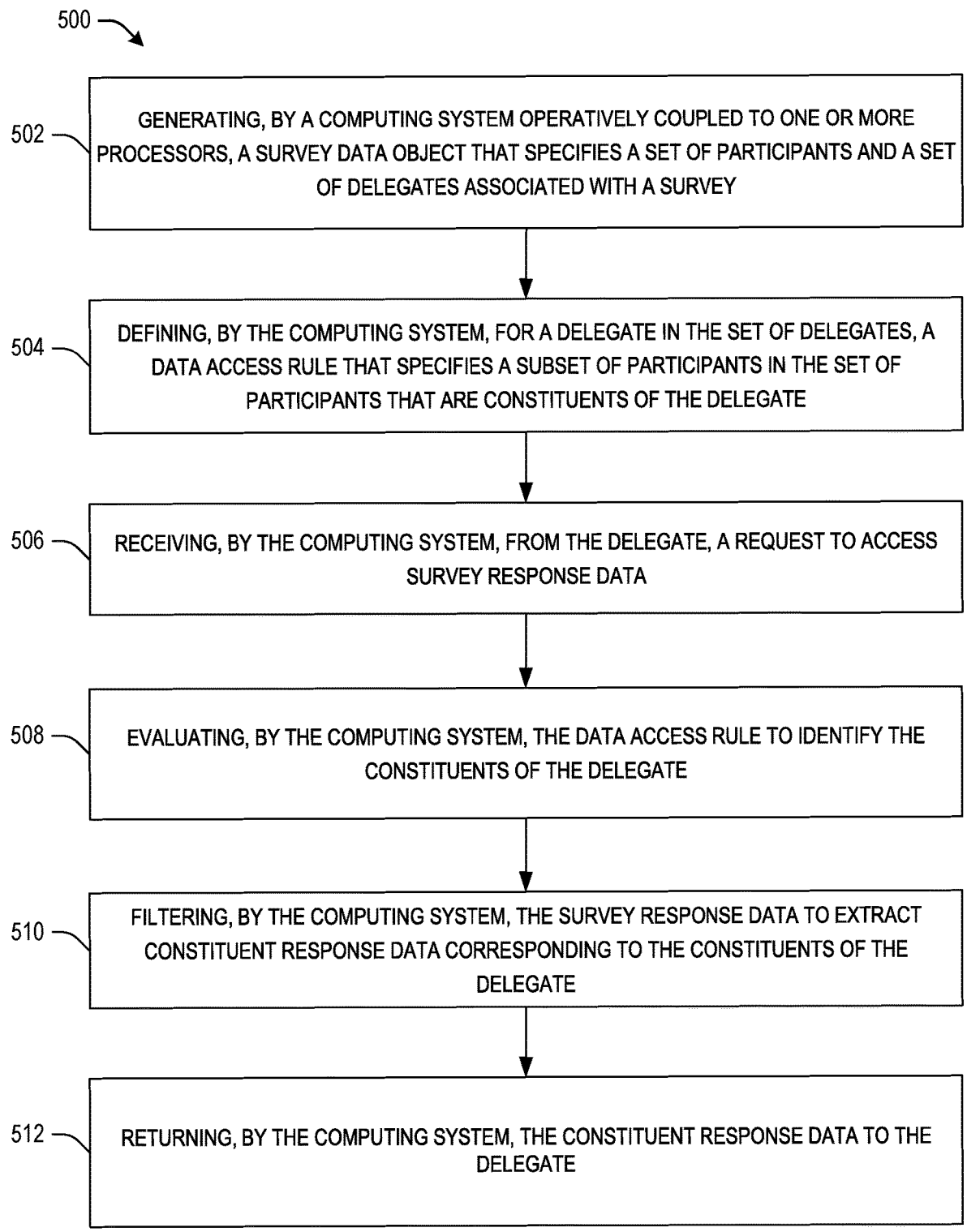
FIGS. 5 and 6 each depict a flow diagram of an example, non-limiting computer-implemented method that can facilitate survey completion and review in accordance with one or more example embodiments of the present disclosure.

FIG. 5 depicts a flow diagram of an example, non-limiting computer-implemented method 500 that can facilitate survey completion and review in accordance with one or more example embodiments of the present disclosure. One or more portions of computer-implemented method 500 can be executed and/or implemented on one or more computing devices or computing systems including, for example, computing system 110, remote computing system 130, one or more computing devices 152, and/or computing device 200. Further, one or more portions of computer-implemented method 500 can be executed and/or implemented as an algorithm and/or as machine-readable instructions (e.g., computer software) on the hardware devices and/or systems disclosed herein. The example embodiment illustrated in FIG. 5 depicts operations performed in a particular order for purposes of illustration and discussion. Those of ordinary skill in the art, using the disclosures provided herein, will understand that various operations or steps of computer-implemented method 500 or any of the methods disclosed herein can be adapted, modified, rearranged, performed simultaneously, include operations not illustrated, omitted, expanded, and/or altered in various ways without deviating from the scope of the present disclosure.

At 502, computer-implemented method 500 can include generating, by a computing system (e.g., computing system 110) operatively coupled to one or more processors (e.g., processor(s) 114), a survey data object (e.g., the survey data object described above and/or survey object 302) that specifies a set of participants (e.g., certain employees of an organization working in a "team member" role in the organization) and a set of delegates (e.g., certain employees of an organization working in a "team manager" role in the organization) associated with a survey (e.g., survey object 302).

At 504, computer-implemented method 500 can include defining, by the computing system, for a delegate in the set of delegates (e.g., a certain employee of the organization working in a "team manager" role in the organization), a data access rule (e.g., the above-described data access rule) that specifies a subset of participants (e.g., a subset of certain employees of the organization working in a "team member" role that are managed by a certain employee working in a "team manager" in the organization) in the set of participants that are constituents of the delegate.

At 506, computer-implemented method 500 can include receiving, by the computing system (e.g., via a network such as, for instance, the Internet), from the delegate (e.g., from a computing and/or communication device associated with the delegate), a request (e.g., data indicative of a request) to access survey response data (e.g., survey responses).

At 508, computer-implemented method 500 can include evaluating, by the computing system, the data access rule to identify the constituents of the delegate. For instance, in one embodiment, to identify the constituents of the delegate, the computing system can access, read, analyze, and/or retrieve (e.g., write) the above-described data access rule that can be in a database that can be stored (e.g., in memory) as described above. In another embodiment, to identify the constituents of the delegate, the computing system can use the above-described defined query language to run a query against an object graph that can include the above-described survey delegation object, where such a query can allow the computing system to access, read, analyze, and/or retrieve (e.g., write) the data access rule that can be in the survey delegation object.

At 510, computer-implemented method 500 can include filtering, by the computing system, the survey response data (e.g., filtering all survey responses) to extract constituent response data corresponding to the constituents of the delegate (e.g., to extract only the survey responses submitted by constituents of the delegate). For example, in at least one example embodiment, the computing system can generate a survey response object (e.g., survey response object 308) for each survey response received from each participant. In this or another example embodiment, each survey response object can include data (e.g., attribute values) that can be indicative of a certain survey response submitted by a certain participant. In this or another example embodiment, each survey response object can specify the role of the participant that submitted the survey response (e.g., the "team member" role and/or the "isDelegateFor(role, constituent)" function). In this or another example embodiment, the computing system can store each survey response object in one or more of the object graphs described above. In some embodiments, to filter the survey response data to extract the constituent response data of the delegate's constituents, the computing system can use the above-described defined query language to run a query against one or more object graphs that can include the survey response objects described above. For instance, in these or other embodiments, the computing system can run such a query to identify and/or extract (e.g., read, write) survey response objects that correspond to the delegate's constituents, thereby allowing the computing system to filter the survey response data (e.g., the survey responses submitted by all participants) and extract constituent response data corresponding to the constituents of the delegate.

At 512, computer-implemented method 500 can include returning, by the computing system, the constituent response data (e.g., the survey responses of the constituents) to the delegate. For example, in at least one embodiment, the computing system can send the constituent response data (e.g., constituent survey responses) to the delegate (e.g., to a computing and/or communication device associated with the delegate) over a network (e.g., via the Internet). In some embodiments, the computing system can render (e.g., via a graphical user interface (GUI)) the constituent response data on a display device (e.g., a monitor, screen, display) that can be coupled (e.g., communicatively, operatively) with the computing system such that the delegate can view such constituent response data via the display device.

Figure 6:
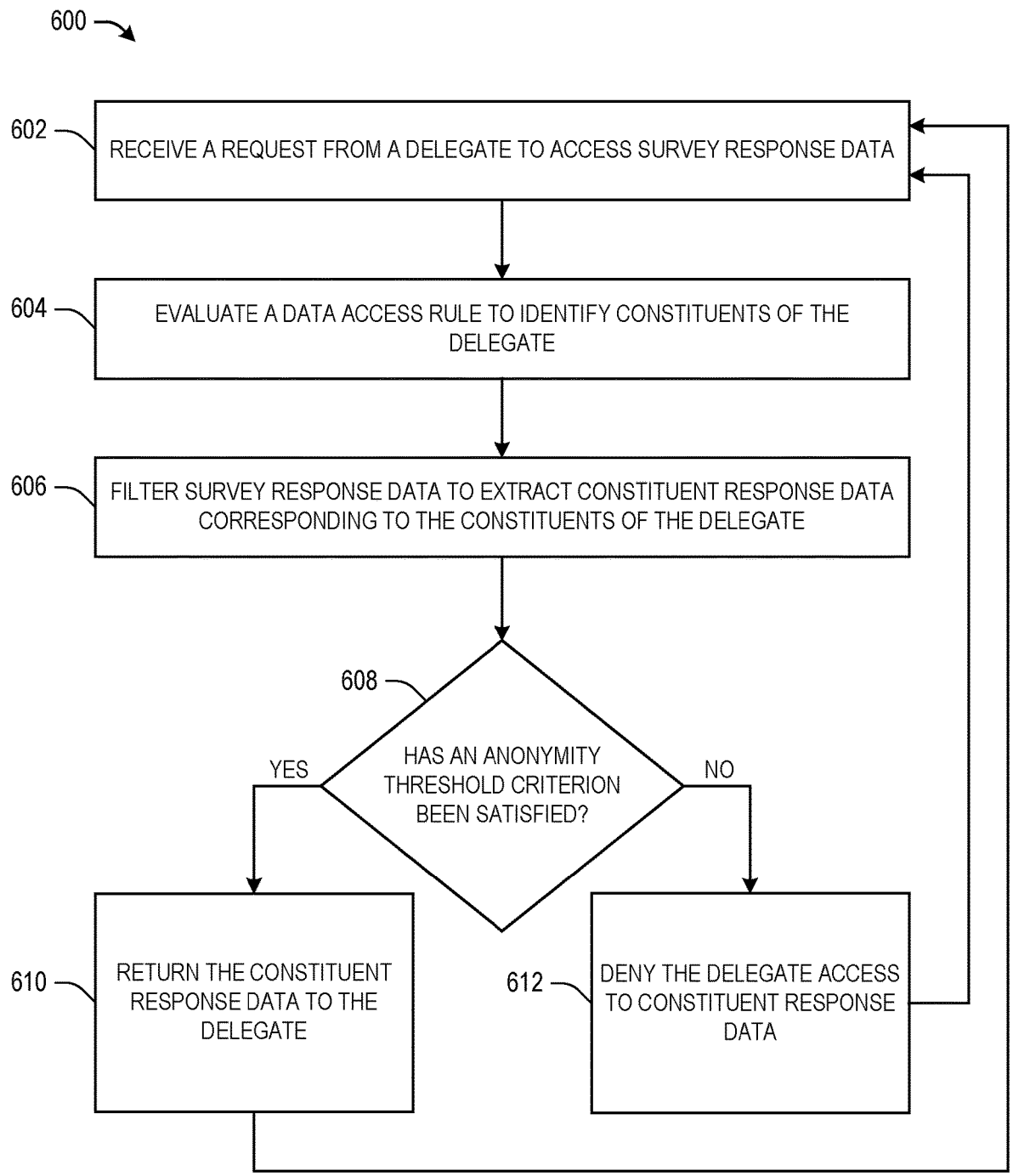

FIG. 6 depicts a flow diagram of an example, non-limiting computer-implemented method 600 that can facilitate survey completion and review in accordance with one or more example embodiments of the present disclosure. One or more portions of computer-implemented method 600 can be executed and/or implemented on one or more computing devices or computing systems including, for example, computing system 110, remote computing system 130, one or more computing devices 152, and/or computing device 200. Further, one or more portions of computer-implemented method 600 can be executed and/or implemented as an algorithm and/or as machine-readable instructions (e.g., computer software) on the hardware devices and/or systems disclosed herein. The example embodiment illustrated in FIG. 6 depicts operations performed in a particular order for purposes of illustration and discussion. Those of ordinary skill in the art, using the disclosures provided herein, will understand that various operations or steps of computer-implemented method 600 or any of the methods disclosed herein can be adapted, modified, rearranged, performed simultaneously, include operations not illustrated, omitted, expanded, and/or altered in various ways without deviating from the scope of the present disclosure.

At 602, computer-implemented method 600 can include receiving (e.g., by computing system 110 via a network such as, for instance, the Internet) a request (e.g., data indicative of a request) from a delegate (e.g., from a computing and/or communication device associated with an employee working in a "team manager" role in an organization) to access survey response data (e.g., survey responses).

At 604, computer-implemented method 600 can include evaluating (e.g., by computing system 110) a data access rule (e.g., the above-described data access rule) to identify the constituents of the delegate. For instance, in one embodiment, to identify the constituents of the delegate, computing system 110 can access, read, analyze, and/or retrieve (e.g., write) the above-described data access rule that can be in a database that can be stored (e.g., in memory) as described above. In another embodiment, to identify the constituents of the delegate, computing system 110 can use the above-described defined query language to run a query against an object graph that can include the above-described survey delegation object, where such a query can allow computing system 110 to access, read, analyze, and/or retrieve (e.g., write) the data access rule that can be in the survey delegation object.

At 606, computer-implemented method 600 can include filtering (e.g., by computing system 110) survey response data (e.g., all survey responses from all participants) to extract constituent response data corresponding to the constituents of the delegate (e.g., to extract only the survey responses submitted by constituents of the delegate). For example, in at least one example embodiment, computing system 110 can generate a survey response object (e.g., survey response object 308) for each survey response received from each participant. In this or another example embodiment, each survey response object can include data (e.g., attribute values) that can be indicative of a certain survey response submitted by a certain participant. In this or another example embodiment, each survey response object can specify the role of the participant that submitted the survey response (e.g., the "team member" role and/or the "isDelegateFor(role, constituent)" function). In this or another example embodiment, computing system 110 can store each survey response object in one or more of the object graphs described above. In some embodiments, to filter the survey response data to extract the constituent response data of the delegate's constituents, computing system 110 can use the above-described defined query language to run a query against one or more object graphs that can include the survey response objects described above. For instance, in these or other embodiments, computing system 110 can run such a query to identify and/or extract (e.g., read, write) survey response objects that correspond to the delegate's constituents, thereby allowing computing system 110 to filter the survey response data (e.g., the survey responses submitted by all participants) and extract constituent response data corresponding to the constituents of the delegate.

At 608, computer-implemented method 600 can include determining (e.g., by computing system 110) whether an anonymity threshold criterion has been satisfied. For example, in one embodiment, computing system 110 can define and/or specify an anonymity threshold criterion that can constitute a minimum quantity of survey responses (e.g., 3, 5, 10) that are to be submitted by the delegate's constituents before the delegate can view the constituent response data in the constituents' responses. In this or another embodiment, the anonymity threshold criterion can specify a defined quantity of the constituents (e.g., a minimum quantity of the constituents) that are to respectively provide survey responses (e.g., survey response data) for the survey before computing system 110 provides the constituent response data to the delegate.

If it has been determined at 608 (e.g., by computing system 110) that the anonymity threshold criterion has been satisfied, at 610, computer-implemented method 600 can include returning (e.g., by computing system 110) the constituent response data to the delegate. For example, in one embodiment, computing system 110 can send the constituent response data (e.g., constituent survey responses) to the delegate (e.g., to a computing and/or communication device associated with the delegate) over a network (e.g., via the Internet). In some embodiments, computing system 110 can render (e.g., via a graphical user interface (GUI)) the constituent response data on a display device (e.g., a monitor, screen, display) that can be coupled (e.g., communicatively, operatively) with computing system 110 such that the delegate can view such constituent response data via the display device. As illustrated in FIG. 6, in some embodiments, computer-implemented method 600 can then repeat operations 602-608.

If it has been determined at 608 (e.g., by computing system 110) that the anonymity threshold criterion has not been satisfied, at 612, computer-implemented method 600 can include denying (e.g., by computing system 110) the constituent response data to the delegate. As illustrated in FIG. 6, in some embodiments, computer-implemented method 600 can then repeat operations 602-608.

Additional Disclosure

Numerous details are set forth in the foregoing description. However, it will be apparent to one of ordinary skill in the art having the benefit of this disclosure that the present disclosure can be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "analyzing," "determining," "identifying," "adjusting," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus can include a computing device that is activated or reconfigured by a computer program comprising electronic instructions stored in the computing device. Such a computer program can be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the appended claims.

The technology discussed herein makes reference to servers, databases, software applications, and other computer-based systems, as well as actions performed by, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system, comprising:
one or more processors; and
one or more non-transitory computer-readable media that store instructions that, when executed by the one or more processors, cause the computing system to perform one or more operations, the one or more operations comprising:
traversing an object graph which comprises a plurality of objects to identify attribute values associated with employees in an organization, wherein the plurality of objects include first objects with first attribute values indicating employees having a first role in the organization and second objects with second attribute values indicating employees having a second role in the organization;
generating a survey data object associated with a survey that specifies a set of participants having the first role in the organization and a set of delegates having the second role in the organization, according to the identified attribute values associated with the employees;
defining a survey distribution rule in a survey distribution object stored in the object graph, the survey distribution rule specifying a trigger event associated with a change in an employee status and specifying a set of survey participants who are to receive the survey from among the set of participants;
in response to detecting the trigger event occurring, distributing the survey to the set of survey participants specified in the survey distribution rule;
defining, for a delegate in the set of delegates specified by the survey data object, a data access rule that specifies a subset of participants who are constituents of the delegate from among the set of survey participants, wherein the data access rule specifies a relationship between the delegate and the constituents, and wherein the data access rule is defined in a delegation object, stored in the object graph, comprising instructions that, when executed, allow an authorized user access to view survey responses of the constituents based at least in part on the relationship;
receiving, from the authorized user, a request to access survey response data;
identifying the authorized user by receiving information relating to the authorized user to authenticate an identity of the authorized user, to determine whether the authorized user is permitted to access the survey responses;
in response to receiving the request and determining the authorized user is permitted to access the survey responses based on the identifying, dynamically evaluating the data access rule to identify the constituents of the delegate by traversing the object graph to identify the constituents of the delegate based on the second role of the delegate;
executing the instructions of the delegation object stored in the object graph to filter the survey response data to extract constituent response data corresponding to the constituents of the delegate identified by traversing the object graph, while omitting survey response data of participants in the set of survey participants who are not identified as constituents of the delegate by traversing the object graph;
returning the constituent response data to the authorized user;
determining whether the constituent response data includes a defined survey response; and
in response to determining the constituent response data includes the defined survey response, executing a computer-implemented task according to a survey response rule associated with the defined survey response, the computer-implemented task including at least one of an execution of an automated workflow or transmitting an electronic notification.

2. The computing system of claim 1, further comprising applying the survey data object universally with respect to the first role and the second role for employees in the organization.

3. The computing system of claim 1, wherein the data access rule specifies a general employment relationship between the delegate and the constituents.

4. The computing system of claim 1, wherein at least one of the survey data object or the data access rule specifies an anonymity threshold criterion that is to be satisfied before the constituent response data is returned to the authorized user, and wherein the anonymity threshold criterion specifies a defined quantity of the constituents that are to respectively return response data for the survey before the constituent response data is returned to the authorized user.

5. The computing system of claim 1, wherein the trigger event associated with the change in the employee status includes one or more of a new hire event when a new employee is hired by the organization, a separation event when an employee leaves the organization, and a promotion event when an employee is promoted to a new role within the organization.

6. The computing system of claim 5, wherein the one or more operations further comprise:
generating, based at least in part on the occurrence of the trigger event, the distribution object that specifies at least one of the survey, the set of survey participants who are to receive the survey from among the set of participants, or a lifecycle of the survey.

7. The computing system of claim 1, wherein the one or more operations further comprise:
defining the survey response rule that specifies the defined survey response in an object; and
wherein
the information relating to the authorized user to authenticate the identity of the authorized user is received via one or more sensors.

8. The computing system of claim 1, wherein the one or more operations further comprise:
defining a survey lifecycle rule that specifies one or more lifecycle states of the survey, and wherein the one or more lifecycle states comprise a draft state, a scheduled state, an open state, a closed state, and an archived state.

9. The computing system of claim 1, wherein the one or more operations further comprise:
defining one or more lifecycle states of the survey based on a publication status or an archive status of the survey and one or more survey distribution windows defined for the survey.

10. The computing system of claim 1, wherein the one or more operations further comprise:
generating, based at least in part on receipt of the request to access the survey response data, the delegation object, and wherein the delegation object specifies at least one of the survey, the delegate, or the constituents.

11. A computer-implemented method to grant partial access to survey responses, the computer-implemented method comprising:
traversing, by a computing system operatively coupled to one or more processors, an object graph which comprises a plurality of objects to identify attribute values associated with employees in an organization, wherein the plurality of objects include first objects with first attribute values indicating employees having a first role in the organization and second objects with second attribute values indicating employees having a second role in the organization;
generating, by the computing system, a survey data object associated with a survey that specifies a set of participants having the first role in the organization and a set of delegates having the second role in the organization, according to the identified attribute values associated with the employees;
defining, by the computing system, a survey distribution rule in a survey distribution object stored in the object graph, the survey distribution rule specifying a trigger event associated with a change in an employee status and specifying a set of survey participants who are to receive the survey from among the set of participants;
in response to detecting the trigger event occurring, distributing, by the computing system, the survey to the set of survey participants specified in the survey distribution rule;
defining, by the computing system, for a delegate in the set of delegates specified by the survey data object, a data access rule that specifies a subset of participants who are constituents of the delegate from among the set of survey participants, wherein the data access rule specifies a relationship between the delegate and the constituents, and wherein the data access rule is defined in a delegation object, stored in the object graph, comprising instructions that, when executed, allow an authorized user access to view survey responses of the constituents based at least in part on the relationship;
receiving, by the computing system, from the authorized user, a request to access survey response data;
identifying, by the computing system, the authorized user by receiving information relating to the authorized user to authenticate an identity of the authorized user, to determine whether the authorized user is permitted to access the survey responses;
in response to receiving the request and determining the authorized user is permitted to access the survey responses based on the identifying, dynamically evaluating, by the computing system, the data access rule to identify the constituents of the delegate by traversing the object graph to identify the constituents of the delegate based on the second role of the delegate;
executing, by the computing system, the instructions of the delegation object stored in the object graph to filter the survey response data to extract constituent response data corresponding to the constituents of the delegate identified by traversing the object graph, while omitting survey response data of participants in the set of survey participants who are not identified as constituents of the delegate by traversing the object graph;
returning, by the computing system, the constituent response data to the authorized user;
determining, by the computing system, whether the constituent response data includes a defined survey response; and
in response to determining the constituent response data includes the defined survey response, executing, by the computing system, a computer-implemented task according to a survey response rule associated with the defined survey response, the computer-implemented task including at least one of an execution of an automated workflow or transmitting an electronic notification.

12. The computer-implemented method of claim 11, further comprising:
applying the survey data object universally with respect to the first role and the second role for employees in the organization.

13. The computer-implemented method of claim 11, wherein the data access rule specifies a general employment relationship between the delegate and the constituents.

14. The computer-implemented method of claim 11, wherein at least one of the survey data object or the data access rule specifies an anonymity threshold criterion that is to be satisfied before the constituent response data is returned to the authorized user, and wherein the anonymity threshold criterion specifies a defined quantity of the constituents that are to respectively return response data for the survey before the constituent response data is provided to the authorized user.

15. The computer-implemented method of claim 11, wherein the trigger event associated with the change in the employee status includes one or more of a new hire event when a new employee is hired by the organization, a separation event when an employee leaves the organization, and a promotion event when an employee is promoted to a new role within the organization.

16. The computer-implemented method of claim 15, further comprising:
generating, by the computing system, based at least in part on the occurrence of the trigger event, the distribution object that specifies at least one of the survey, the set of survey participants who are to receive the survey from among the set of participants, or a lifecycle of the survey.

17. The computer-implemented method of claim 11, further comprising:
defining, by the computing system, the survey response rule that specifies the defined survey response in an object.

18. The computer-implemented method of claim 11, further comprising:
defining, by the computing system, a survey lifecycle rule that specifies one or more lifecycle states of the survey, and wherein the one or more lifecycle states comprise a draft state, a scheduled state, an open state, a closed state, and an archived state.

19. The computer-implemented method of claim 11, further comprising:
defining, by the computing system, one or more lifecycle states of the survey based on a publication status or an archive status of the survey and one or more survey distribution windows defined for the survey.

20. One or more tangible non-transitory computer-readable media storing computer-readable instructions that, when executed by one or more processors, cause the one or more processors to perform operations, the operations comprising:
traversing an object graph which comprises a plurality of objects to identify attribute values associated with employees in an organization, wherein the plurality of objects include first objects with first attribute values indicating employees having a first role in the organization and second objects with second attribute values indicating employees having a second role in the organization;
generating a survey data object associated with a survey that specifies a set of participants having the first role in the organization and a set of delegates having the second role in the organization, according to the identified attribute vales associated with the employees;
defining a survey distribution rule in a survey distribution object stored in the object graph, the survey distribution rule specifying a trigger event associated with a change in an employee status and specifying a set of survey participants who are to receive the survey from among the set of participants;
in response to detecting the trigger event occurring, distributing the survey to the set of survey participants specified in the survey distribution rule;
defining, for a delegate in the set of delegates specified by the survey data object, a data access rule that specifies a subset of participants who are constituents of the delegate from among from among the set of survey participants, wherein the data access rule specifies a relationship between the delegate and the constituents, and wherein the data access rule is defined in a delegation object, stored in the object graph, comprising instructions that, when executed, allow an authorized user access to view survey responses of the constituents based at least in part on the relationship;
receiving, from the authorized user, a request to access survey response data;
identifying the authorized user by receiving information relating to the authorized user to authenticate an identity of the authorized user, to determine whether the authorized user is permitted to access the survey responses;
in response to receiving the request and determining the authorized user is permitted to access the survey responses based on the identifying, dynamically evaluating the data access rule to identify the constituents of the delegate by traversing the object graph to identify the constituents of the delegate based on the second role of the delegate;
executing the instructions of the delegation object stored in the object graph to filter the survey response data to extract constituent response data corresponding to the constituents of the delegate identified by traversing the object graph, while omitting survey response data of participants in the set of survey participants who are not identified as constituents of the delegate by traversing the object graph;
returning the constituent response data to the authorized user;
determining whether the constituent response data includes a defined survey response; and
in response to determining the constituent response data includes the defined survey response, executing a computer-implemented task according to a survey response rule associated with the defined survey response, the computer-implemented task including at least one of an execution of an automated workflow or transmitting an electronic notification.

* * * * *